United States Patent
Looi et al.

(10) Patent No.: US 9,754,236 B2
(45) Date of Patent: Sep. 5, 2017

(54) FRAMEWORK AND METHODOLOGY FOR MANAGING DATA BETWEEN DATA SYSTEMS

(71) Applicant: Oracle International Corporation, Redwood Shores, CA (US)

(72) Inventors: Kok-Wai Looi, Plano, TX (US); Kim S. Klieger, Allen, TX (US); Kenneth M. Benner, Frisco, TX (US)

(73) Assignee: Oracle International Corporation, Redwood Shores, CA (US)

( * ) Notice: Subject to any disclaimer, the term of this patent is extended or adjusted under 35 U.S.C. 154(b) by 226 days.

(21) Appl. No.: 14/051,592

(22) Filed: Oct. 11, 2013

(65) Prior Publication Data

US 2015/0106242 A1 Apr. 16, 2015

(51) Int. Cl.
*G06Q 10/00* (2012.01)
*G06Q 10/08* (2012.01)

(52) U.S. Cl.
CPC .................. *G06Q 10/087* (2013.01)

(58) Field of Classification Search
None
See application file for complete search history.

(56) References Cited

U.S. PATENT DOCUMENTS

| | | | | |
|---|---|---|---|---|
| 6,622,127 B1* | 9/2003 | Klots | ........... | G06F 17/30902 705/22 |
| 7,774,243 B1* | 8/2010 | Antony | ........... | G06Q 10/087 414/243 |
| 8,407,110 B1* | 3/2013 | Joseph | ........... | G06Q 30/0633 705/26.1 |
| 8,688,540 B1* | 4/2014 | Patel | ........... | G06Q 20/0855 705/26.1 |
| 2003/0033205 A1* | 2/2003 | Nowers | ........... | G06Q 30/06 705/26.2 |
| 2003/0115072 A1* | 6/2003 | Manucha | ........... | G06Q 10/083 707/770 |
| 2003/0172007 A1* | 9/2003 | Helmolt | ........... | G06Q 10/087 705/28 |
| 2003/0212602 A1* | 11/2003 | Schaller | ........... | G06Q 20/203 705/22 |
| 2004/0117337 A1* | 6/2004 | Beck | ........... | G06Q 10/10 |
| 2004/0254842 A1* | 12/2004 | Kirkegaard | ........... | G06Q 10/063 705/22 |
| 2007/0017984 A1* | 1/2007 | Mountz | ........... | G06Q 10/087 235/385 |
| 2007/0021864 A1* | 1/2007 | Mountz | ........... | G06Q 10/087 700/216 |
| 2007/0192215 A1* | 8/2007 | Taylor | ........... | G06Q 10/087 705/28 |

(Continued)

*Primary Examiner* — Fateh M Obaid
(74) *Attorney, Agent, or Firm* — Invoke

(57) ABSTRACT

The present disclosure provides for managing data between data systems. A request, originating from a management system, is received by a unified inventory management system. Such a request comprises a request for inventory from one or more inventory systems. A first inventory system is identified. The first inventory system manages a first portion of inventory needed to fulfill the request. Thereafter, a second inventory system is identified. The second inventory system manages a second portion of inventory that is also needed to fulfill the request.

16 Claims, 22 Drawing Sheets

(56) References Cited

U.S. PATENT DOCUMENTS

| | | | |
|---|---|---|---|
| 2007/0198383 A1* | 8/2007 | Dow | G06Q 40/06 705/35 |
| 2010/0280889 A1* | 11/2010 | Gabriel | G06Q 30/02 705/14.4 |
| 2011/0251875 A1* | 10/2011 | Cosman | G06Q 10/087 705/7.31 |
| 2014/0279294 A1* | 9/2014 | Field-Darragh | G06Q 10/087 705/28 |

* cited by examiner

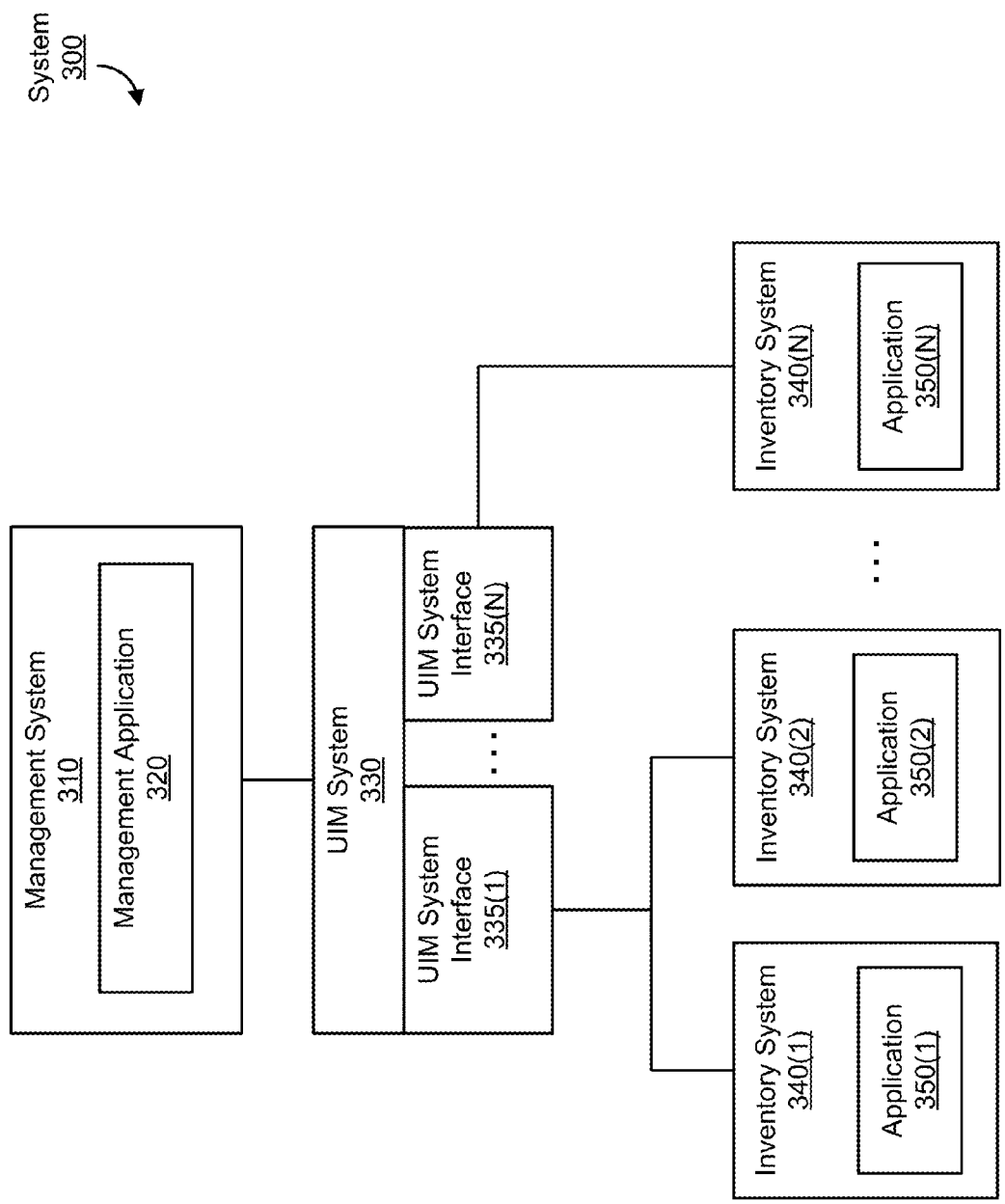

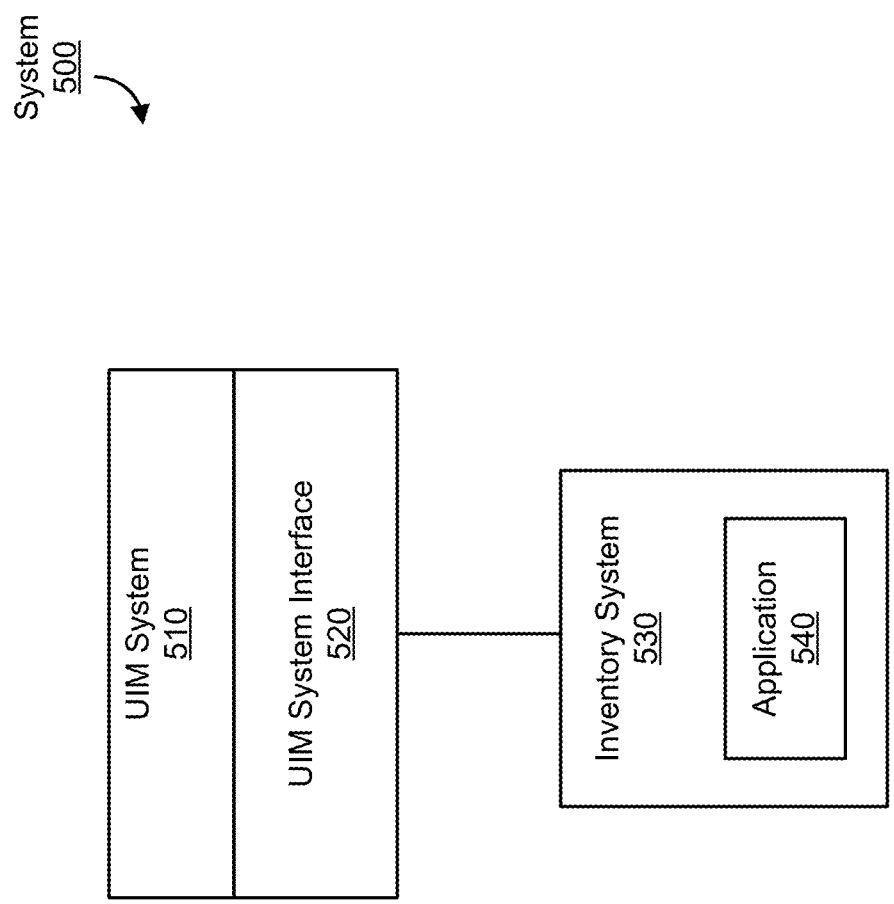

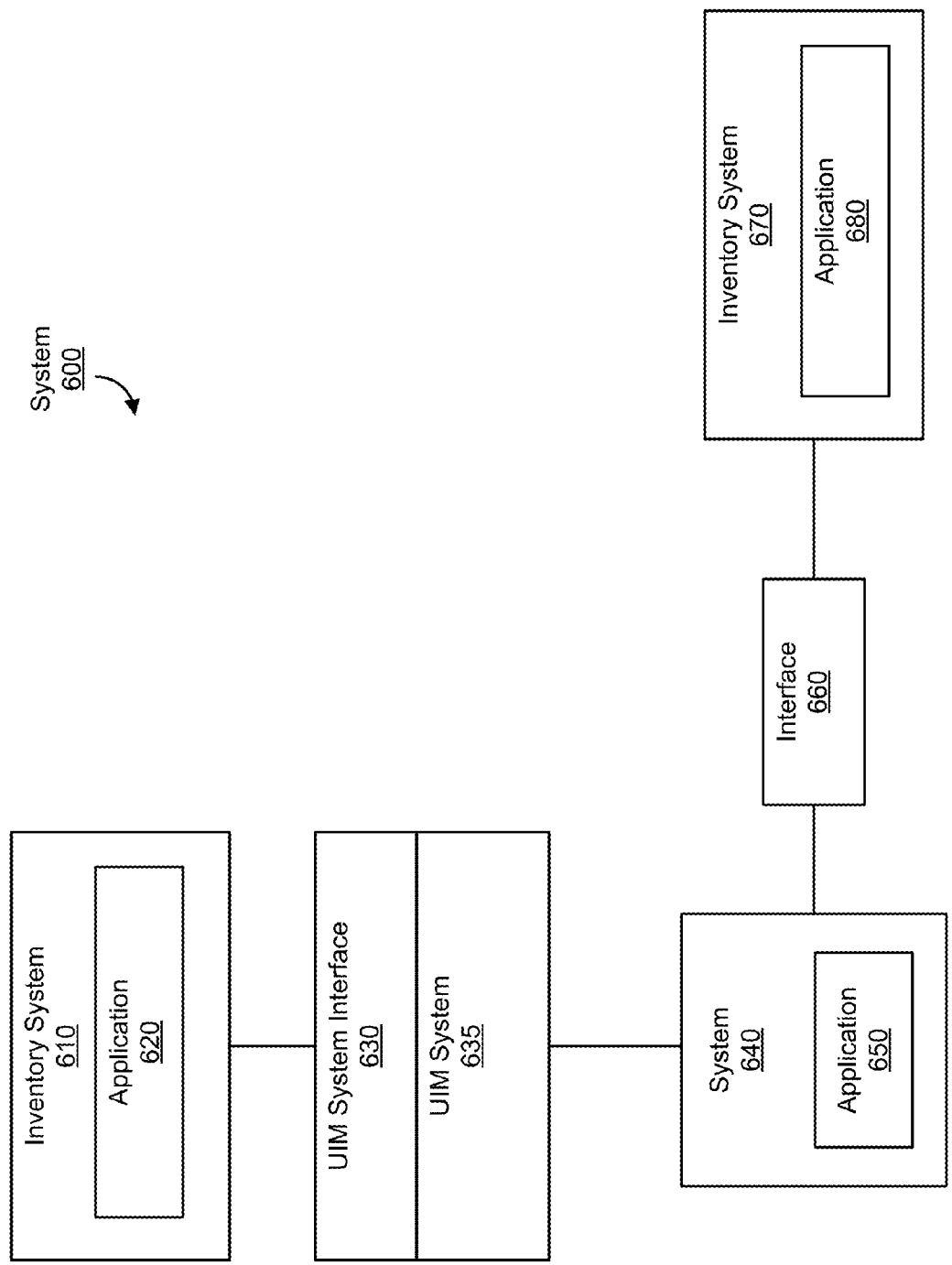

FRAMEWORK AND METHODOLOGY FOR MANAGING DATA BETWEEN DATA SYSTEMS

FIELD OF THE INVENTION

This invention relates to data management, and more particularly, to managing data between disparate data systems.

BACKGROUND OF THE INVENTION

Data systems vary greatly in functionality. As such, data systems can be configured according to the needs of an organization. One example configuration for data systems is inventory management. In this case, data systems are typically referred to as inventory systems.

Each inventory system can be implemented to track and manage inventory by maintaining certain inventory information. In some cases, combining inventory information provided by one or more inventory systems can be useful. However, various problems may be encountered when attempting to share and/or combine inventory information from one or more existing inventory systems and/or when attempting to share inventory information between existing inventory systems and new data systems.

SUMMARY OF THE INVENTION

The present disclosure provides for managing data between data systems. A request, originating from a management system, is received by a unified inventory management system. Such a request comprises a request for inventory from one or more inventory systems. A first inventory system is identified. The first inventory system manages a first portion of inventory needed to fulfill the request. Thereafter, a second inventory system is identified. The second inventory system manages a second portion of inventory that is also needed to fulfill the request.

BRIEF DESCRIPTION OF THE DRAWINGS

The present invention may be better understood, and its numerous objects, features, and advantages made apparent to those skilled in the art by referencing the accompanying drawings.

FIG. 3 is a simplified block diagram illustrating components of yet another example system in which the present disclosure can be implemented, according to one embodiment.

FIG. 5 is a simplified block diagram illustrating components of yet another example system in which the present disclosure can be implemented, according to one embodiment.

FIG. 6 is a simplified block diagram illustrating components of yet another example system in which the present disclosure can be implemented, according to one embodiment.

Figure 1:
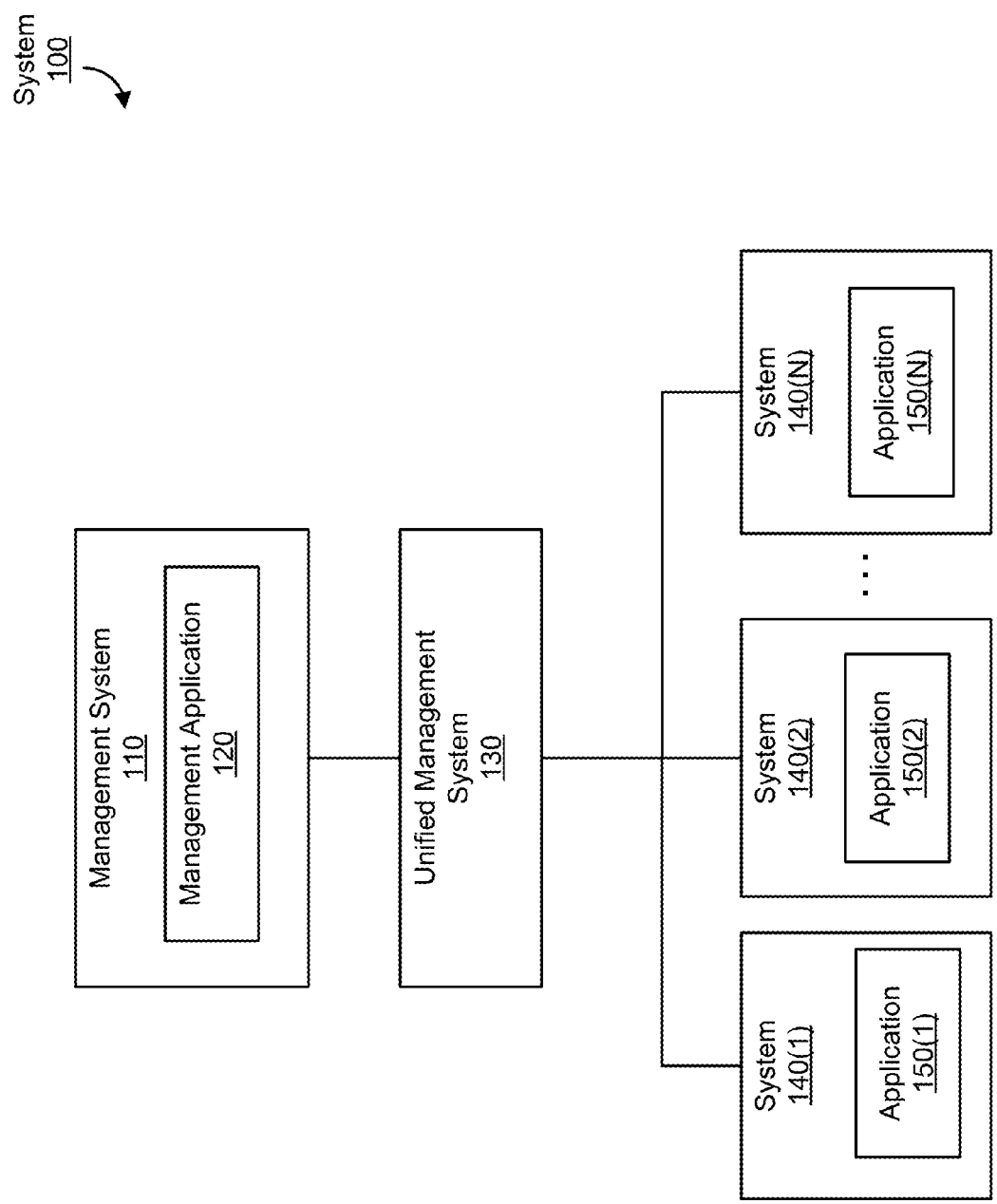
FIG. 1 is a simplified block diagram illustrating components of an example system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intentions are to cover all modifications, equivalents, and alternatives falling within the spirit and scope of the present disclosure as defined by the appended claims.

DETAILED DESCRIPTION

Inventory management systems are systems designed to track and manage inventory and data related to such inventory. For example, inventory and data related thereto can include quantitative data representing quantities of inventory (e.g., number of resources, number of employees, number of goods of a certain type, and so on), analytical data representing a process flow or a service, and/or billing data associated with how inventory is priced and billed.

An organization can employ numerous inventory management systems to support business needs. Each inventory system can be configured to track and manage one or more types of inventory. In addition, an organization's pre-existing inventory systems can be a result of customization, acquisition, and/or commercial off the shelf products. As will be appreciated in light of the present disclosure, the term "inventory" is used throughout and can represent one or more types of information (numerical data, statistical data, analytical data, and so on) related to products, parts, manufacturing resources, and so on.

In some cases, an organization may wish to launch a new service. In order to do so, an organization may need to incorporate and/or modify inventory provided by current inventory systems. Thus, launching a new service may require combining new systems with current inventory management systems and/or combining inventory and/or inventory information provided by one or more current inventory management systems. However, new systems may not be able to communicate with current inventory management systems. In addition, current inventory management systems may not be able to communicate with other current inventory management systems and/or doing so may be slow and costly.

One possible solution to enable new services is to replace current inventory systems with newer inventory systems. However, doing so can be costly, time-consuming, and/or duplicative. Another possible solution is to employ a unified inventory management (UIM) system that acts as an intermediary between new systems and current inventory management systems, in the manner of embodiments of the systems disclosed herein. Using a common communication technique, UIM can allow communications and/or inventory sharing to occur between such systems. Doing so shortens the amount of time needed for an organization to implement a new service and also allows current inventory systems to be re-used. Moreover, using a UIM system also reduces the complexity associated with managing inventory and/or inventory information from a number of inventory systems, thereby reducing the risk of cost overruns and schedule delays. Further, use of UIM systems such as those described herein provides control over migration to and integration of newer systems (e.g., the "roll-out" of new systems).

Employing a UIM system between new systems and current inventory management systems is thus a preferable approach by organizations. In order to do so, a UIM system employs one or more cooperation frameworks between such systems. A cooperation framework is a framework (e.g., concepts and methodologies) which enables systems (e.g., new systems and current inventory management systems) to reliably share and cooperate inventory in a well-structured form (e.g., using a common schema). In addition, inventory management systems can share inventory with other inventory management systems and/or new systems using interaction agreements. An example of such agreements are referred to as lease agreements, and allow each system involved to have designated roles (e.g., such as lessor and lessee) for the duration of the agreement.

When using lease agreements, any number of modes of cooperation can be employed, four examples of which are disclosed subsequently. A mode of cooperation enables each system to understand its responsibilities for the duration of an agreement. One mode of cooperation is referred to as federated. In this mode, inventory data from one inventory system is available to another system for the purpose of referencing, viewing, or otherwise obtaining information regarding inventory (e.g., having no authority to update or delete the inventory). The system making a request for inventory information is considered the requesting system. The requesting system is provided information regarding the inventory in question from a responding system (e.g., the system providing the inventory requested).

A second mode of cooperation can be a lease-in mode. In this mode, a requesting inventory system makes a request to use inventory (e.g., having authority to use and possibly modify the inventory as needed) with an imposed contract of exclusivity to the inventory data throughout the duration of the agreement. The inventory data is then shared according to the terms of the lease agreement. In addition, the agreement itself can also be terminated based on the agreement terms.

A third mode of cooperation can be a lease-out mode. In this mode, a system responds to a request to obtain inventory with an imposed contract and responsibilities of exclusivity to the requesting system. Thus, the lease agreement defines the nature of the agreement, the length and conditions of the agreement, and the responsibilities of each system during the agreement.

A fourth mode of cooperation can be a shared mode. In this mode, cooperating systems enter into an agreement to share inventory data for designated purposes and within pre-defined conditions. The sharing agreement defines the duration of the agreement, conditions for terminating the agreement, conditions for sharing inventory, and the responsibilities of each cooperating system.

Additionally, agreements made between cooperating systems may also be made using one of two styles of cooperation. One style is transactional and is accomplished in the context of messages exchanged between the systems. The second style of cooperation is conversational. With a conversational style, cooperation is accomplished via an organized process of message interchanges transacted over a period of time based on agreement terms.

In order to properly manage systems within a cooperation agreement, specific information properties are used, in some embodiments. For example, an external object identification property can be used to uniquely define inventory. An external name property can be used to provide a name to an inventory system to provide the inventory. In addition, an external management domain property can be used to identify the cooperating systems participating in the data cooperation. An external arrangement property can also be used to identify the mode of cooperation (e.g., federated, lease-in, lease-out, and shared) that is being used between the cooperating systems.

An organization can thus provide new services using pre-existing inventory systems, in combination with new systems, by using a UIM system that acts as an intermediary. In addition, such functionality can be facilitated by utilizing a common communication technique and cooperation agreements. FIGS. 1-6 illustrate exemplary embodiments for enabling cooperation between systems, with variations according to the type of data being cooperated, the type and number of components used, and/or the modes of cooperation used.

FIG. 1 illustrates an example system 100 that allows various systems to interact and/or share data with one another via a unified management system. In the embodiment shown, system 100 includes management system 110 (which further includes management application 120), unified management system 130, and one or more systems 140(1)-(N) (which further include applications 150(1)-(N)).

In the embodiment depicted in FIG. 1, management system 110 makes a request for data. Such data is maintained and managed by one or more of systems 140(1)-(N). Such data can be requested in order to provide a new service that uses or builds upon the requested data. For example, the requested data can be a request for inventory data, billing data, and/or customer data. A request for data is typically made using management application 120. The request for data can involve combining data supplied by one or more of systems 140(1)-(N), referred to collectively herein as systems 140.

As a result of incompatibilities, management system 110 is typically unable to communicate with (and thus obtain data directly from) systems 140, at least, in an effective manner (e.g., one which would allow the desired operations to be successfully performed). This can be a result of management system 110 and systems 140 using different techniques (e.g., using different communication techniques to communicate) and/or different data transfer implementations. As a result, management system 110 communicates with unified management system 130 in order to obtain the necessary data from systems 140. Communications and/or interactions occurring between management system 110 and unified management system 130 utilize a common communication technique (e.g., a common language, such as XML schemas or others) that is recognizable by both systems. In a setting in which XML schemas are used, this type of common communication technique utilizes names and functionality in a way that is repeatable when unified management system 130 communicates with systems 140. Thus, communications and/or interactions occurring between unified management system 130 and systems 140 can be designed such that the same communication techniques are utilized in such communications.

Figure 14:
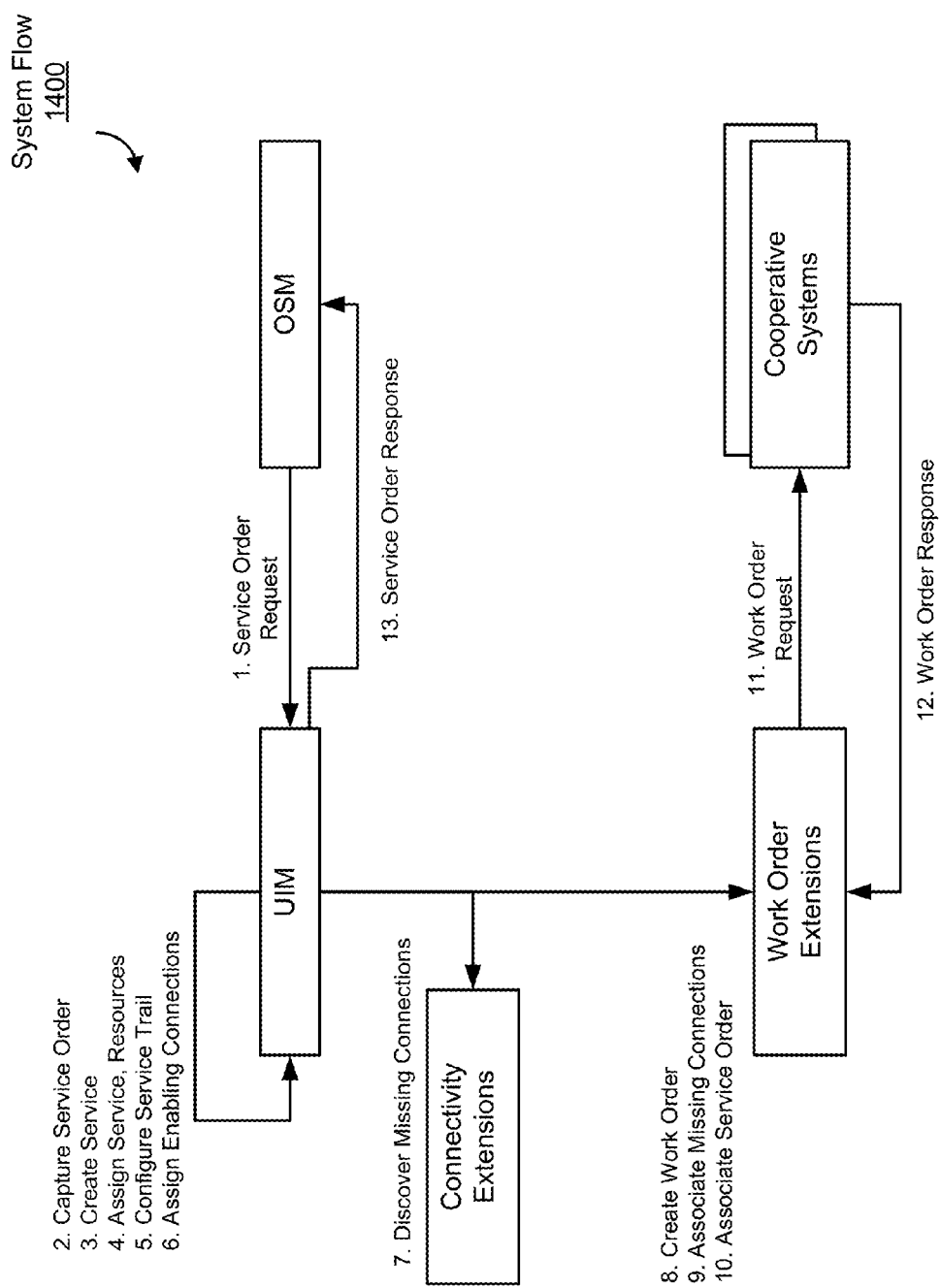
FIG. 14 is a simplified block diagram illustrating elements of an example application for inventory management, according to one embodiment.

In addition, data sharing and/or data exchanges occurring between management system 100 and systems 140 (via unified management system 130) are performed using interaction agreements (e.g., a cooperating agreement or lease agreement). Each system has a role, such as produced-consumer, supplier-consumer or lessor-lessee. In addition, data is shared between the systems using pre-defined interactions, business rules, and processes that can be defined, for example, using a common communication form. FIG. 14 and the content therein provide examples of a common schema, pre-defined interactions, business rules, and processes, in the context of communication service providers.

Unified management system 130 is responsible for managing communications and/or data sharing between management system 110 and systems 140. Such functionality includes receiving request for data from management system 110, communicating with each of systems 140, and setting up cooperation agreements between management system 110 and systems 140 to enable data cooperation. Unified management system 130 utilizes a common communication technique to communicate with and receive data from each of systems 140 and from management system 110.

In response to a request for data from management system 110, unified management system identifies the plurality of systems 140 that have, or can provide, the data requested by management system 110. Once identified, unified management system 130 identifies the number and type of cooperation agreements that need to be established to provide the necessary data from systems 140 to management system 110. For example, unified management system 130 can identify the systems that are to be involved in a cooperation agreement (e.g., management system 110 as the requesting system and a system 140 for each agreement needed), the mode of cooperation that is to be employed for each cooperation agreement (e.g., federate, lease-in, lease-out, or share), the style of cooperation that is to be employed, the duration of the agreement, details regarding the termination of the cooperation agreement, and so on.

Once the cooperation agreements have been defined, unified management system 130 creates a corresponding request for each system 140 that contains a portion of the data needed to fulfill the request made by management system 110. These requests are formatted in a common form that is recognized and understandable by systems 140. In addition, each corresponding request includes details regarding the cooperation agreement that is to be established between management system 110 and the corresponding system 140. For example, the request can identify management system 110 as the requesting system, system 140 as the responding system, a lease-in mode of cooperation, a transactional style of cooperation, a length of the agreement, and so on.

Such requests are then transmitted from unified management system 130 to each corresponding system 140. The requests are received by systems 140 via corresponding applications 150. Once received, systems 140 can interpret the received data requests (in the common form) to understand the type of action to be taken. Each corresponding system 140 can then retrieve the requested data, modify the requested data, if needed, and/or perform additional operations to obtain the requested data (e.g., by generating the data, communicating with other systems to obtain the data, and so on). In addition, each corresponding system 140 can create and transmit additional notifications to unified management system 130 to inform unified management system 130 that the cooperation agreement has been successfully established, is in progress, is being modified, or will be terminated. Other notifications can also be sent when an error has occurred, when the requested data cannot be obtained, and/or when changes and/or terminations to the cooperation agreement are to be made, for example.

In the event that a cooperation agreement is successfully established (e.g., meaning that the requested data will be communicated according to the cooperation agreement), the requested data is transmitted from the given one of systems 140 to unified management system 130. In a similar manner, unified management system 130 can receive requested data from each of systems 140 that received a request for data. Unified management system 130 maintains information regarding the status of each request sent to each of systems 140. For example, unified management system 130 can maintain information that indicates when a request is sent to one of systems 140, when a response has been received from the requisite ones of systems 140, and when a cooperation agreement has been successfully created, modified, and/or terminated.

Once unified management system 130 has received the requested data from systems 140, unified management system 130 can use such data to generate a complete response for management system 110. Generating a complete response can involve combining the requested data and/or performing additional operations on the data. Thereafter, unified management system 130 can transmit the generated response to management system 110 using management application 120. In addition, other notifications can also be transmitted to management system 110, before or after a complete response is communicated. These other notifications can be transmitted to update the status of the request and/or cooperation agreement.

Similar functionality can be utilized for other purposes. For example, management system 110 and certain of systems 140 can communicate with one another, via unified management system 130, to establish a cooperation agreement, to modify a cooperation agreement, and/or to terminate a cooperation agreement. Doing so can involve the use of a common communication technique, along with proper identification of cooperating systems, information regarding the cooperation agreement, and actions to be taken in that regard.

Figure 2:
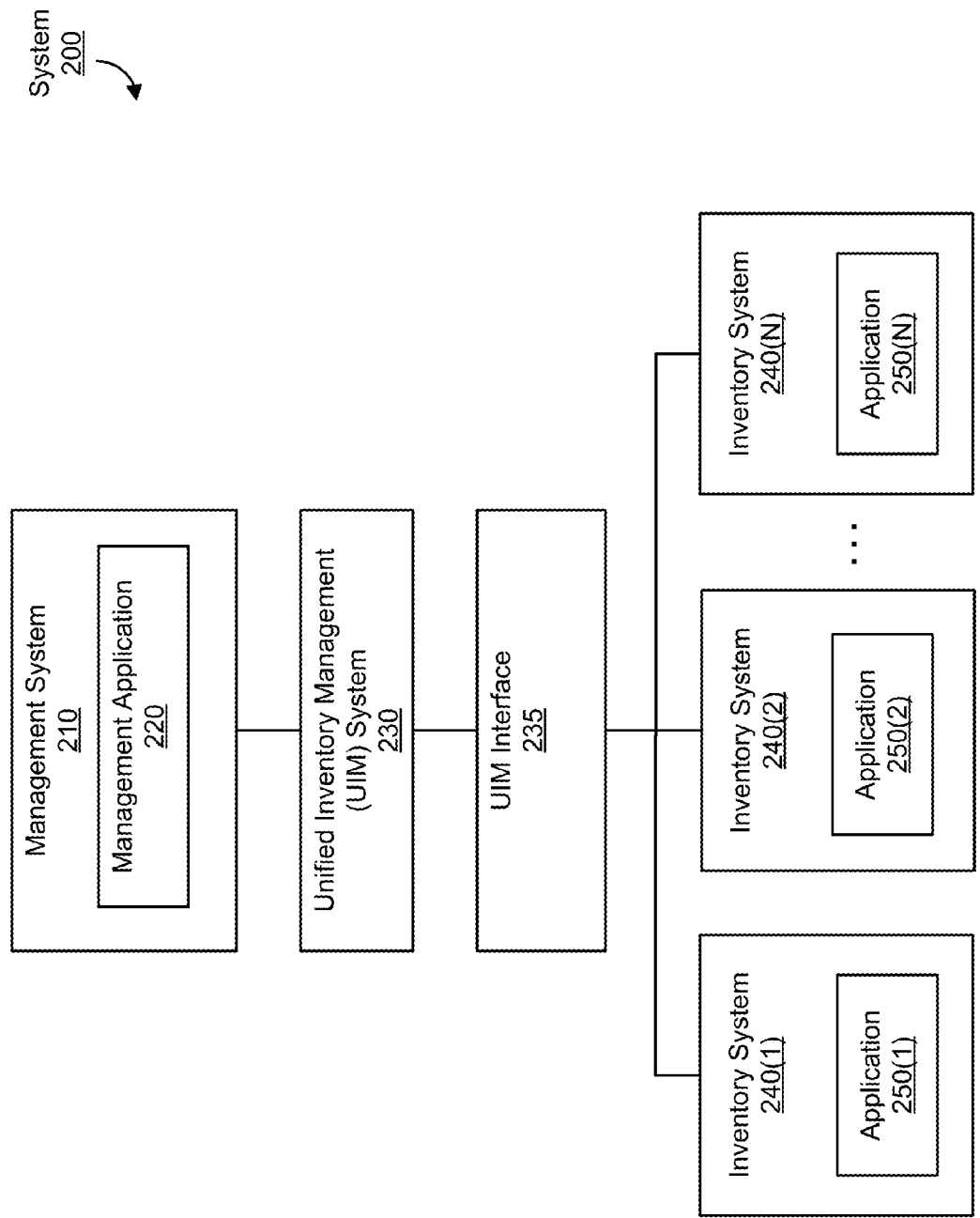
FIG. 2 is a simplified block diagram illustrating components of another example system in which the present disclosure can be implemented, according to one embodiment.

FIG. 2 illustrates an example system 200 that also allows various systems to communicate and share data with one another. In the embodiment shown, system 200 includes management system 210 (which further includes management application 220), a UIM system 230, a UIM system interface 235, and one or more inventory systems 240(1)-(N) (which further include applications 250(1)-(N)). The functionality of system 200 is similar to that of system 100, except that system 200 is designed to manage inventory data, whereas system 100 is useful in managing any type of data (e.g., inventory and/or non-inventory data).

Management system 210 submits a request for inventory data using management application 220. This request for inventory data can be submitted in order to provide a new service, for example. In addition, a request for inventory is a request for one or more units of inventory data, as supplied by one or more inventory systems 240(1)-(N), which are referred to herein collectively as inventory systems 240.

As shown, UIM system 230 serves as an intermediary between management system 210 and inventory systems 240. In addition, a UIM system interface 235 (illustrated as a separate component) is used to enable communications between UIM system 230 and inventory systems 240. Although not shown, UIM system interface 235 can be part of, or directly coupled to, UIM system 230 and/or inventory systems 240.

UIM system interface 235 receives inventory requests (e.g., a request for inventory that is formatted using the common communication technique) from UIM system 230. In response thereto, UIM system interface 235 converts such inventory requests into a form usable by those of inventory systems 240 to which such inventory requests are directed. For example, UIM system interface 235 can take an inventory request, in the common form, and convert such an inventory request into another form that is native to one of inventory systems 240. This type of conversion allows an inventory request to be received and understood by an inventory system 240, thereby enabling a cooperation agreement to be established and/or modified.

Each inventory system 240 may communicate in a form that is different from other inventory systems 240. Thus, UIM system interface 235 may need to perform one or more conversions of a single inventory request or multiple inventory requests, in order to transmit a corresponding inventory request to each of inventory systems 240 that is understandable by each of inventory systems 240. The same types of conversions apply when UIM system interface 235 receives a response back from each of inventory systems 240. Thus, UIM system interface 235 may need to perform the necessary conversions to convert a response from one of inventory systems 240, from its native form, back to the common communication technique, prior to submitting such a response back to UIM system 230.

In system 200, a request is initiated by management system 210 and transmitted to UIM system 230 using management application 220. UIM system 230 determines what portions of inventory are needed to respond to (e.g., satisfy) the request and how many/what types of cooperation agreements are needed to obtain such portions of inventory. Thus, UIM system 230 can generate the necessary lease requests, and transmits such lease requests to the corresponding one of inventory systems 240 via UIM system interface 235. UIM system interface 235 acts a centralized interface for inventory systems 240.

Upon receiving lease requests from UIM system 230, UIM system interface 235 determines what, if any, conversions may be needed for each inventory request to enable the inventory requests to be properly interpreted by each corresponding one of inventory systems 240. Once properly formatted, the new inventory requests are transmitted to each corresponding one of inventory systems 240 using each corresponding one of applications 250.

Inventory systems 240 receive these inventory requests and determine what to do in response, based on the contents of the corresponding inventory request. For example, each inventory request can specify the type of cooperation agreement to be setup, the length of time the agreement is to be in force, the type of inventory and/or inventory information to be shared, and so on. Accordingly, each of inventory systems 240 can perform the necessary operations to allocate the inventory requested. For example, each of inventory systems 240 may have the necessary inventory data in its requested form or may need to perform further operations to obtain, generate, and/or otherwise allocate the requested inventory.

Once the inventory is available, the inventory is transmitted to UIM system 230 via UIM system interface 235. Alternatively, each of inventory systems 240 can respond to an inventory request by transmitting a notification to UIM system 230, which can indicate that the retrieval and/or generation of inventory is in progress, cannot be completed, or has completed, for example.

Once UIM system 230 receives an indication that the requisite inventory data has been allocated, UIM system 230 can merge the inventory data and/or perform additional operations on the inventory data to generate a complete response to the request submitted by management system 210. Merging inventory may involve combining and/or sorting information related to the requested inventory, as received from each one of inventory systems 240. Additional operations may also be performed on such inventory information, before or after such merging occurs.

Thereafter, a complete response can then be transmitted to management system 210. Other notifications and/or status updates can also be transmitted to management system 210 while the inventory is being requested and obtained. Examples of such notifications and/or status updates can include notifications that inventory is being allocated, notifications that inventory has been successfully allocated, status updates that a response is being generated, and so on.

Additional changes to a cooperation agreement may also be addressed by further requests transmitted in either direction within system 200. For example, management system 210 may change a cooperation agreement by requesting more or less inventory, or indicating that the cooperation agreement should be terminated. Likewise, one or more of inventory systems 240 may change a cooperation agreement by indicating that inventory is no longer available, requesting a modification thereto, or by terminating the cooperation agreement, for example.

FIG. 3 illustrates an example system 300 for enabling various systems to communicate with and cooperate inventory with one another. In the embodiment shown, system 300 includes management system 310 (which further includes management application 320), a UIM system 330, one or more UIM system interfaces 335(1)-(N), and one or more inventory systems 340(1)-(N) (which further include applications 350(1)-(N)).

System 300 is similar to system 200 of FIG. 2. As will be appreciated, system 200 utilizes a single, centralized, UIM system interface for management of inventory systems, while system 300 utilizes numerous UIM system interfaces 335(1)-(N). Specifically, system 300 utilizes a UIM system interface 335(1) as an interface between UIM system 330 and inventory systems 340(1) and 340(2), and another UIM system interface 335(N) between UIM system 330 and inventory system 340(N), with still other UIM interfaces between UIM system 330 and others of inventory systems 340. As shown, UIM system interface 335(1) provides an interface for two different inventory systems, inventory system 340(1) and 340(2). In such a scenario, UIM system interface 335(1) can receive one or two inventory requests from UIM system 330 and perform one conversion or two conversions, with each conversion being unique to each of inventory systems 340(1) and 340(2).

Once a response has been received by UIM system interface 335(1) from inventory systems 340(1) and (2), unified management system interface 335(1) can perform the necessary conversions to convert the responses from their native form into the common form used by UIM system 330. In doing so, UIM system interface 335(1) can create and send two responses back to UIM system 330 (one from each inventory system) or a single response that combines the inventory data from inventory systems 340(1) and 340 (2).

System 300 further illustrates the use and importance of UIM system interfaces 335. Essentially, additional inventory systems can be added to system 300 by adding additional UIM system interfaces between the additional inventory systems and UIM system 330. Thus, as long as additional UIM system interfaces can perform the necessary conversions to convert requests and responses from one form (native to the additional inventory systems) to the common communication technique used by UIM system 330, system 300 can be easily expanded to provide new services using pre-existing inventory systems.

Figure 4A:
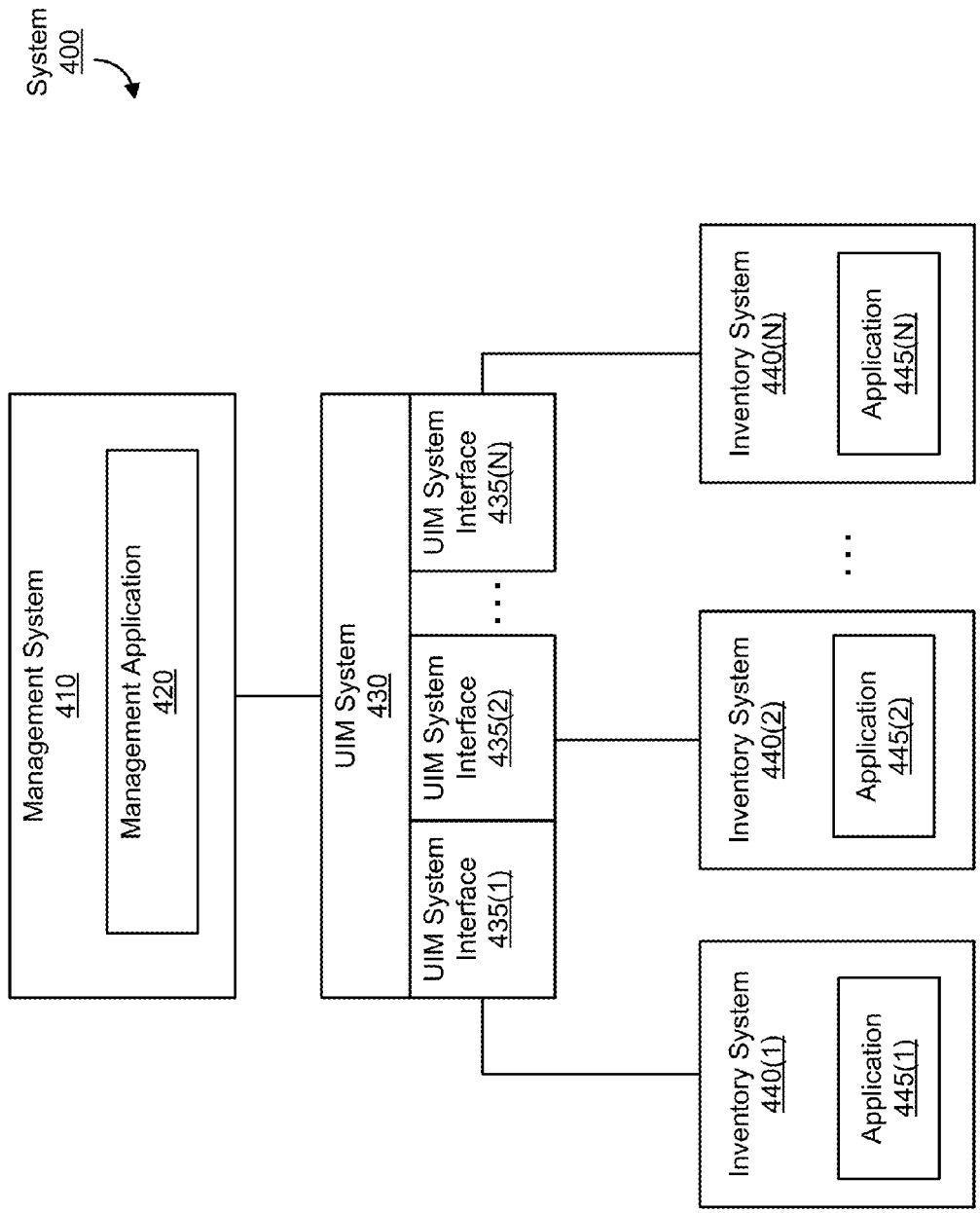
FIG. 4A is a simplified block diagram illustrating components of yet another example system in which the present disclosure can be implemented, according to one embodiment.
Figure 4B:
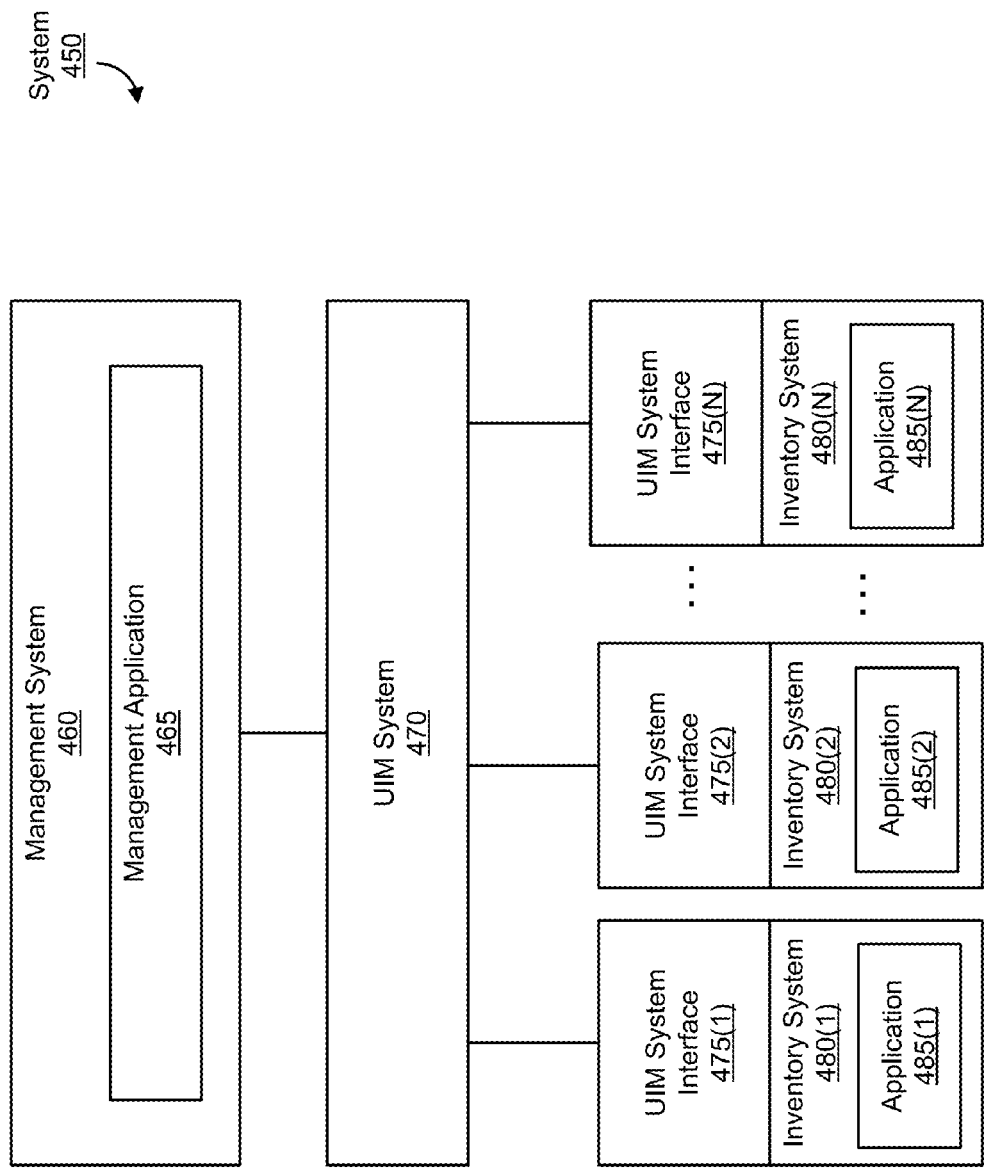
FIG. 4B is a simplified block diagram illustrating components of yet another example system in which the present disclosure can be implemented, according to one embodiment.

FIGS. 4A and 4B further illustrate exemplary systems that allow various systems to communicate with one another and cooperate inventory data with one another. As shown, system 400 of FIG. 4A and system 450 of FIG. 4B are similar to system 300 of FIG. 3. In addition, system 400 includes varying numbers of UIM system interfaces and varying locations of the UIM system interfaces.

FIG. 4A illustrates system 400. System 400 includes a management system 410 (which further includes management application 420), a UIM system 430, one or more UIM system interfaces 435(1)-(N), and one or more inventory systems 440(1)-(N) (which further includes one or more applications 445(1)-(N)).

As shown, system 400 includes a plurality of UIM system interfaces 435(1)-(N), with each of UIM system interfaces 435 being uniquely dedicated to a single inventory system 440, though as will be appreciated in light of the present disclosure, this need not necessarily be the case. In addition, system 400 incorporates the UIM system interfaces as being part of the UIM system 430, though again, other alternative forms will be apparent in view of the present disclosure. The functionality of each of UIM system interfaces 435 is similar to that in systems 200 and 300 and merely require the conversion of requests and responses from a native form to the common form used by UIM system 430 and vice versa.

FIG. 4B illustrates an alternative embodiment. In the embodiment shown, system 450 includes a management system 460 (which further includes management application 465), a UIM system 470, one or more UIM system interfaces 475(1)-(N), and one or more inventory systems 480(1)-(N) (which further include one or more applications 485(1)-(N)).

System 450 is similar to system 400 of FIG. 4A. As depicted in FIG. 4A, each of UIM system interfaces 435 may be made part of UIM system 430. System 450 of FIG. 4B illustrates that each of UIM system interfaces 475 may be part of each inventory system 480. The functionality of the UIM system interfaces 475 in system 450 are similar to that of UIM system interfaces 435 in system 400.

Thus, FIGS. 1, 2, 3, 4A, and 4B illustrate that a UIM system interface may be included as part of the overall system that allows for inventory cooperation to occur between a UIM system and one or more inventory systems, or can be separate therefrom. FIGS. 2, 3, 4A, and 4B further illustrate that a UIM system interface may be its own component, integrated into a UIM system, or integrated into one or more inventory systems. As shown in FIG. 2, the UIM system interface may be its own component and may act as an interface for inventory systems 240. FIG. 3 illustrates that a UIM system interface may be part of the UIM system 330. In addition, FIG. 3 illustrates that a UIM system interface may act as an interface for a single inventory system or a combination of two or more inventory systems, among other variations. FIG. 4A illustrates that there may be a UIM system interface for each corresponding inventory system, and each UIM system interface may be part of a UIM system, among other variations. FIG. 4B illustrates that each inventory system may have its own UIM system interface that may be part of the inventory system itself.

FIG. 5 illustrates another example system 500, in which systems according to the present disclosure can be implemented. System 500 allows for a cooperation agreement to be enforced, where inventory data is leased-out from a UIM system to an inventory system. In the embodiment shown, system 500 includes a UIM system 510, a UIM system interface 520, and an inventory system 530 (which further includes an application 540).

In system 500, inventory system 530 submits an inventory request using application 540. This inventory request is a request for inventory and/or inventory information that is provided by UIM system 510. The inventory request is first received by UIM system interface 520.

UIM system interface 520 performs the necessary conversions to convert the inventory request from its original form into a common communication technique that is used by UIM system 510. Once UIM system 510 receives the inventory request, UIM system 510 can allocate the necessary inventory, according to the inventory request, and provide the inventory information to inventory system 530 (e.g., by providing information regarding that inventory, indicating the various characteristics thereof). Alternatively, system 500 can exclude UIM system interface 520, if inventory system 530 is able to communicate using the common communication technique.

FIG. 6 is a simplified block diagram illustrating components of another example system such as those disclosed herein (depicted in FIG. 6 as system 600), in which techniques according to the present disclosure can be implemented. In the embodiment shown, system 600 includes inventory system 610 (which further includes an application 620), UIM system interface 630, UIM system 635, a system 640 (which further includes an application 650), an interface 660, and an inventory system 670 (which further includes an application 680).

System 600 illustrates a further extension of system 100, 200, 300, 400, and/or 500. In this case, various systems and inventory systems can be coupled to one another directly or using an UIM system to provide inventory information to requesting systems. In addition, a variety of cooperation agreements can be employed to provide inventory and/or inventory information between the systems. For example, UIM 635 can lease-out inventory data to inventory system 610, as needed. In addition, system 640 can lease-in inventory data from UIM 635 and/or inventory system 610. Moreover, system 640 can communicate with inventory system 670 to obtain additional inventory data directly from inventory system 670 using dedicated interface 660.

Figure 7:
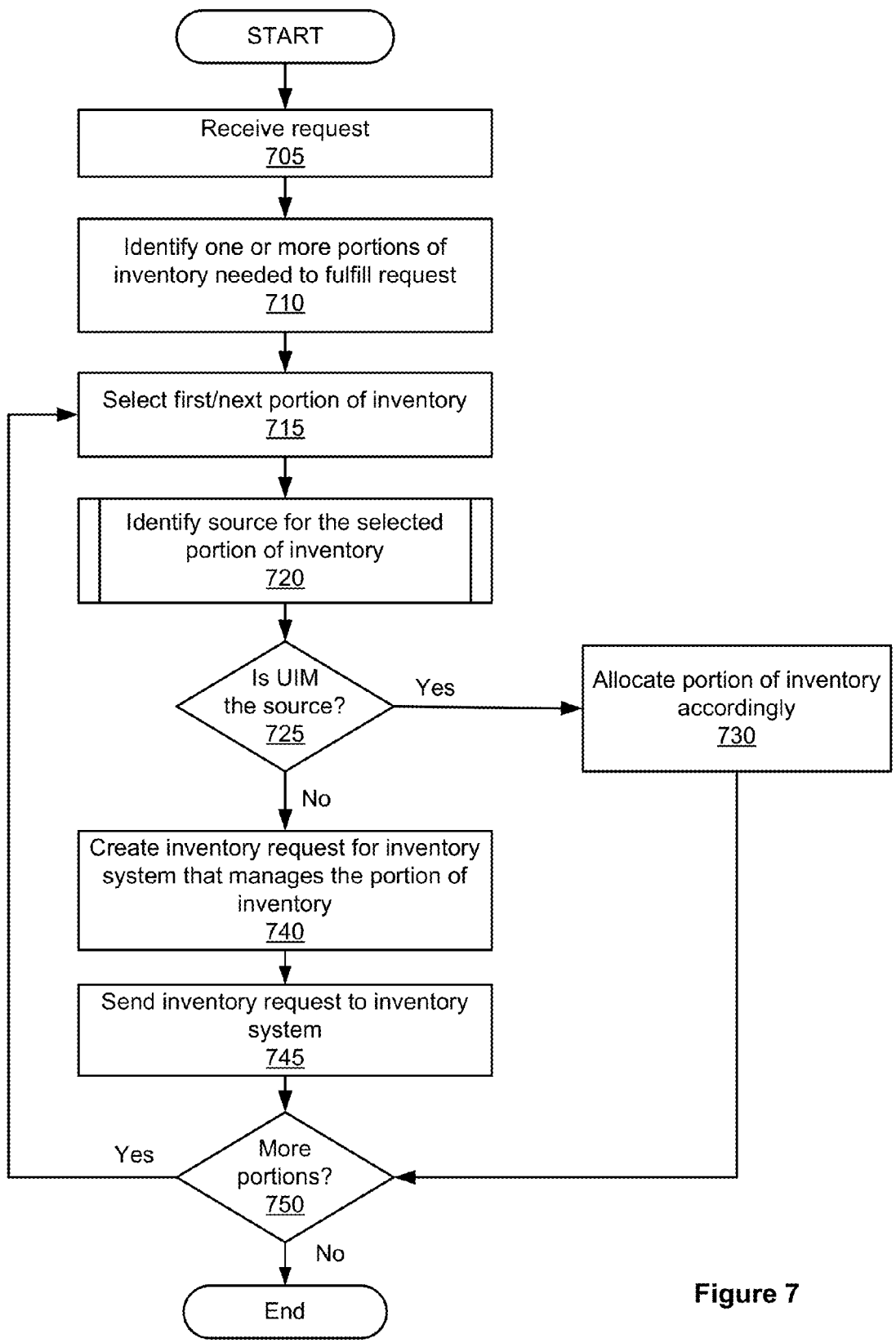
FIG. 7 is a flowchart illustrating an example process implemented by a unified inventory management system, according to one embodiment.

FIG. 7 is a flowchart illustrating an example process implemented by a UIM system. The process begins at operation 705, where the UIM system receives a request. Typically, this request is a request sent from a management system to the UIM system, as part of attempting to provide a new service or a product. Such a request can be a request for portions of inventory that may already be provided by one or more pre-existing inventory systems and/or the UIM system. Thus, responding to such a request may require the allocation of inventory by the pre-existing inventory systems and/or the UIM system, as well as combining inventory information to provide a complete response.

The request received at 705 will typically include the necessary information to enable the UIM system and inventory systems to properly allocate the requested portions of inventory. Thus, such a request defines the operations, actions, and data requirements needed to enable the UIM system to request a lease of inventory, to receive information regarding the inventory, to establish a lease agreement, and to manage the inventory throughout the life of the lease agreement, as well as to perform other such operations as may be necessary. As an example, a request can be generated using a common format, such as an XML schema, where the request includes the necessary properties therein.

Specific details included in a request may include location information (for identifying end points), device information, lease information (including start and end dates), and/or connectivity properties. Connectivity properties can include, for example, an identifier for the type of request being made, the type of activity (create, change, disconnect, and so on) sought, technology involved, bandwidth requirements, signaling information, termination information, location arrays, device arrays, and so on.

The process then continues to operation 710, where the UIM system identifies one or more portions of inventory needed to fulfill the request received in operation 705. These portions of inventory may originate from inventory systems and/or the UIM system itself. In addition, providing a complete response to the request may require merging and/or modifying such portions of inventory and/or inventory information in some manner.

Once all portions of inventory data have been identified, a first portion of inventory is selected at operation 715. Once selected, the process continues to operation 720, where a source is identified for the selected portion of inventory. Identifying a source for a portion of inventory requires identifying which of the pre-existing inventory systems and/or the UIM system can retrieve or generate such inventory data. Details regarding the identification of the source for a selected portion of inventory data can be seen with regards to FIG. 8.

In operation 725, a determination is made as to whether the UIM system is the source for the selected portion of inventory. In the event that the UIM system is the source, the process continues to operation 730. At operation 730, the portion of inventory is allocated accordingly. Allocating a portion of inventory involves the establishment of a cooperation agreement (e.g., lease agreement) between the involved systems, including the identification of the requesting system (e.g., the management system) and the responding system (e.g., the UIM system), the duration of the agreement, the type of inventory data that is needed, the type of agreement being made (e.g., a lease agreement in a lease-in mode), the level of exclusivity that will be used with the data (e.g., exclusive permission to view and modify the inventory), how and when the agreement can be terminated, and so on. Once the UIM system implements the lease agreement, the corresponding portion of inventory is considered to be allocated.

In the event that the UIM system is not the source for the portion of inventory, the process continues to operation 740. At operation 740, an inventory request is created for the inventory system that sources (or can source) the selected portion of inventory data. The inventory request is a request that can identify the portion of inventory data that is needed, as well as other information that identifies other details regarding the inventory data. For example, an inventory request can provide information that enables the inventory system to establish a cooperating agreement, in a particular mode, and provide the necessary inventory data for a given period of time.

The process then continues to operation 745, where the inventory request is sent from the UIM system to the appropriate inventory system. Doing so enables the inventory system to receive the inventory request and allocate the requested portion of inventory accordingly. Details regarding how an inventory system allocates inventory data can be seen with regards to FIG. 11.

In addition, the inventory request may first be sent to a UIM system interface, prior to being transmitted to the inventory system. In some systems, the inventory request is transmitted to the inventory system in a common form that is recognized by the UIM system, but not recognized by the inventory system. As such, the inventory request in the common form must first be translated by the UIM system interface into a form that is recognizable by the targeted inventory system(s). Details regarding this alternative can be seen with regards to FIG. 10.

Thereafter, the process continues to operation 750. In operation 750, a determination is made as to whether additional portions of inventory data must be processed. If there are remaining portions of inventory to be processed, the process continues back to operation 715, where the next portion of inventory is selected. The process then continues through operations 720, 725, 730, 740, 745, and 750. If a determination is made at operation 750 that no additional portions of inventory are to be processed, the process ends.

The process of FIG. 7 may be applied, for example, in the area of telecommunications to implement a new service. Implementing a new service may require the use of existing inventory systems. These pre-existing inventory systems may include pre-existing network connections and/or pre-existing technologies. Using pre-existing inventory systems, in combination with new systems and a UIM system, may be a quicker and more efficient way to provide the new service, rather than configuring all new inventory systems.

Likewise, the process of FIG. 7 may also be applied, for example, in the area of manufacturing to manage a variety of information regarding one or more products. By combining inventory data from various inventory systems, a management system may collect a variety of information regarding such products. As an example, pre-existing inventory systems may provide information regarding the quantity of parts available for making such products, the number and type of employees needed for making such products, the process used for making such products, and so on.

Figure 8:
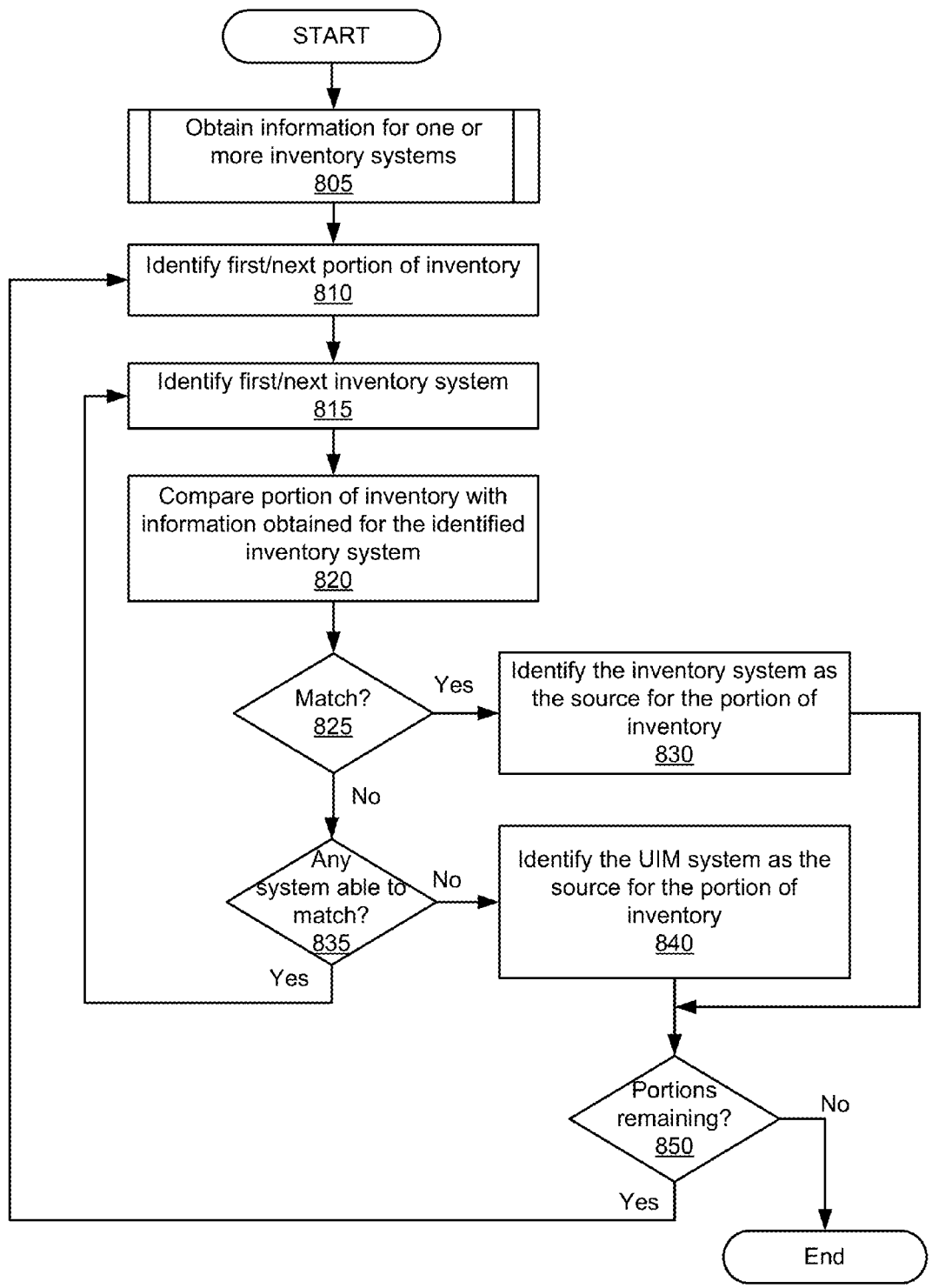
FIG. 8 is a flowchart illustrating another example process implemented by a unified inventory management system, according to one embodiment.

FIG. 8 is a flowchart illustrating an example process implemented by a UIM system. The process begins at operation 805 where the UIM system obtains information regarding one or more inventory systems. This information can be any type of information that lets the UIM system determine what type of inventory data is maintained and/or managed by each inventory system or any additional systems coupled to the inventory systems. In addition, this information also enables the UIM system to determine what connections exist, if any, what types of interfaces are involved, and so on.

A UIM system may be coupled to one or more inventory systems and thus the information obtained in operation 805 may include the collection of information from the one or more inventory systems coupled to the UIM system. This data may be obtained by the UIM system in response to the UIM system having requested such data from each inventory system. Details regarding how this information is obtained by the inventory systems can be seen with regards to FIG. 9.

The process then continues to operation 810, where a first portion of inventory data is identified. The process then continues to operation 815, where a first inventory system is identified. At operation 820, the UIM system compares the portion of inventory data identified in operation 810 with the information obtained for the first inventory system. Such a comparison is performed to determine whether a match is found between the inventory data needed and the inventory data that is available from the first inventory system. Such a determination is made at operation 825.

If a match is found in operation 825, the process continues to operation 830. In operation 830, the UIM system identifies the first inventory system as the source for the first portion of inventory. Thereafter, the process continues to operation 850. Alternatively, if a match is not found in operation 825, the process continues to operation 835. In operation 835, a determination is made as to whether any other inventory system coupled to the UIM system can be reconfigured to provide the requested portion of inventory. If there are no other inventory systems that can be reconfigured to provide the requested portion of inventory, the process continues to operation 840. In operation 840, the UIM system is identified as the source for the portion of inventory. The process then continues to operation 850. In the event that another one of the inventory systems can be reconfigured to provide the requested portion of inventory, the process loops back to operation 815, where the next inventory system is identified. The process then continues to operation 820 and so on, using information for the next inventory system.

Once the process arrives at operation 850, a determination is made as to whether any remaining portions of inventory are left to be analyzed. If there are still portions of inventory that remain to be analyzed, the process loops back to operation 810. In operation 810, the next portion of inventory is identified and the process continues with operation 815 and so on. However, if a determination is made in operation 850 that no portion of inventory data remains to be analyzed, the process ends. Thus, the functionality of FIG. 8 is performed for all portions of inventory data identified by the UIM system (e.g., the results of operation 710 of FIG. 7).

Alternatively, the analysis performed in the process of FIG. 8 can be modified such that a portion of inventory is first compared against inventory managed by the UIM system. Once a determination is made that the UIM system is not the source for the portion of inventory, the analysis may then compare the portion of inventory with the inventory data managed by each inventory system. Other such alternatives will be apparent in view of the present disclosure.

Figure 9:
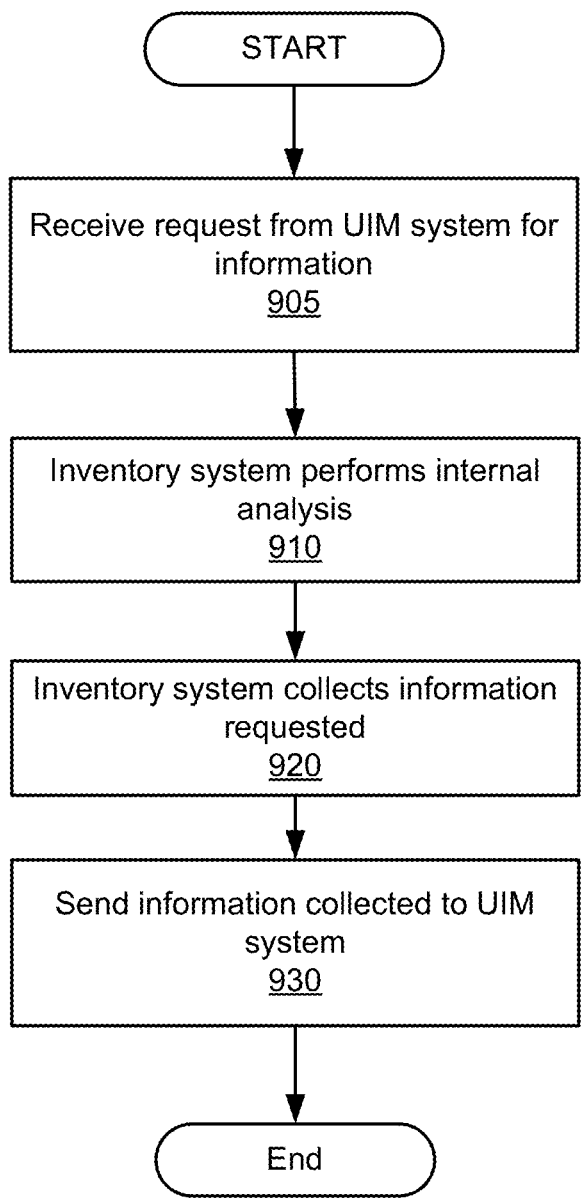
FIG. 9 is a flowchart illustrating an example process implemented by an inventory system, according to one embodiment.

FIG. 9 is a flowchart illustrating an example process implemented by an inventory system, in response to receiving a request from a UIM system. Such a request is received in operation 905. Typically, this type of request is received from the UIM system (or from a UIM system interface) seeking to discover what, if any, types of inventory are available to or maintained by the inventory system. Such a request can be broad and require that the inventory system provide a list of all inventory available to or maintained by the inventory system. Alternatively, such a request can be more specific and merely request that the inventory system confirm or deny that certain inventory is available to, or managed by, the inventory system.

Once the information request is received, the process continues to operation 910. In operation 910, the inventory system performs an internal analysis to determine what inventory data is available to the inventory system, what inventory data is able to be generated by the inventory system, and/or what inventory data is already maintained by inventory system.

An inventory system can perform internal analysis in a number of different ways. For example, an inventory system can analyze a database of information to determine whether the inventory system collects the requested inventory data. Alternatively, an inventory system can also require additional analysis to be performed within the inventory system itself, or components coupled thereto, to obtain the information needed to fulfill the request. For example, an inventory system may need to send additional requests out to other components to which the inventory system is coupled. These components can then be instructed to provide information back to the inventory system. The information received back from the other components can then be used alone, or in combination with other information supplied by the inventory system, to provide a proper response to the UIM system.

The process then continues to operation 920. In operation 920, the inventory system collects the information requested. This information can be collected from the inventory system itself, from other components coupled thereto, or from a combination of the two. The process then continues to operation 930. In operation 930, the information collected in operation 920 is sent to the UIM system either directly or via a UIM system interface. The process then ends.

Figure 10:
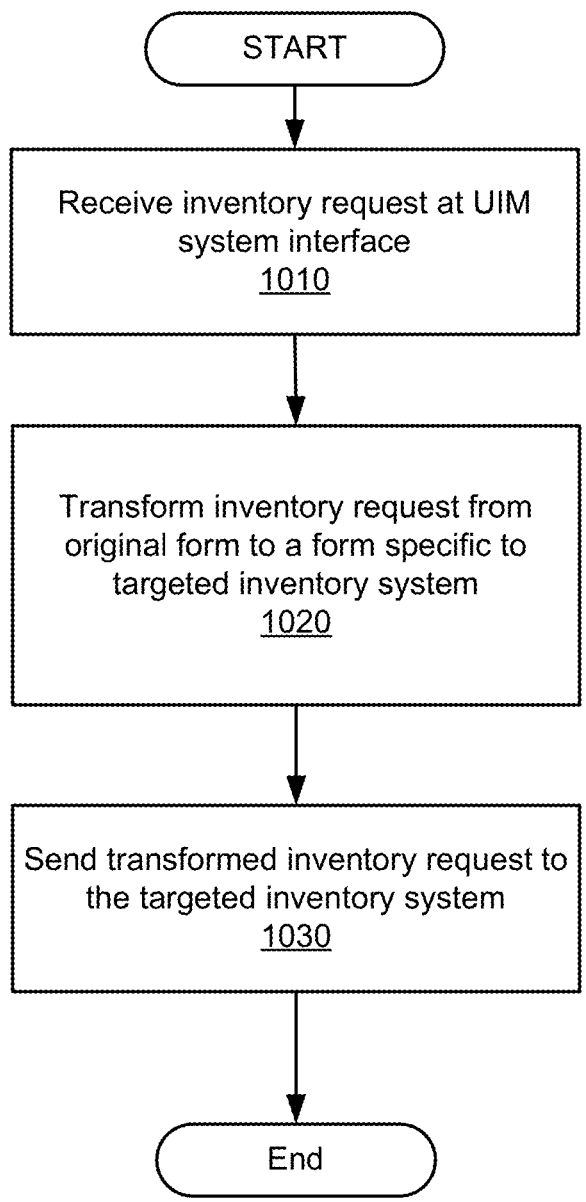
FIG. 10 is a flowchart illustrating an example process implemented by a unified inventory management interface, according to one embodiment.

FIG. 10 is a flowchart illustrating an example process implemented by a UIM system interface. A UIM system interface may be servicing two or more inventory systems or may be uniquely dedicated to servicing only one inventory system. Thus, the amount of translations being performed by a UIM system interface may vary.

The process begins at operation 1010, where the UIM system interface receives an inventory request. This inventory request is received from a UIM system and typically directed to one or more inventory systems. The UIM system interface can then use the contents of the inventory request to determine what inventory systems the inventory request should be sent to. Once the inventory systems have been identified, the process continues to operation 1020.

In operation 1020, the inventory request is transformed by the UIM system interface, as needed. An inventory request is typically received in a common form that is unique or specific to the UIM system. However, this common form may not be recognizable or understandable by an inventory system. It is for this reason that the UIM system interface transforms an inventory request from the original form to a secondary form, where the second form is specific to one or more targeted inventory systems.

In some cases, a UIM system interface services two or more inventory systems and those inventory systems communicate in the same manner. Thus, the UIM system interface need only perform one transformation of the inventory request, even though the inventory request is being transmitted to multiple inventory systems. In other cases, however, the inventory systems serviced by the same UIM system interface communicate in different forms. In these cases, the UIM system will need to perform several transformations of the inventory requests in their original form (e.g., from the original form to a first native form and from the original form to a second native form), prior to transmitting the inventory request to each corresponding inventory system.

Once the transformations have occurred in operation 1020, the process continues to operation 1030. In operation 1030, the inventory request, in its transformed state, is sent from the UIM system interface to each targeted inventory system. The process then ends. As will be appreciated, the process of FIG. 10 can be repeated by each UIM system interface employed within a system.

Figure 11:
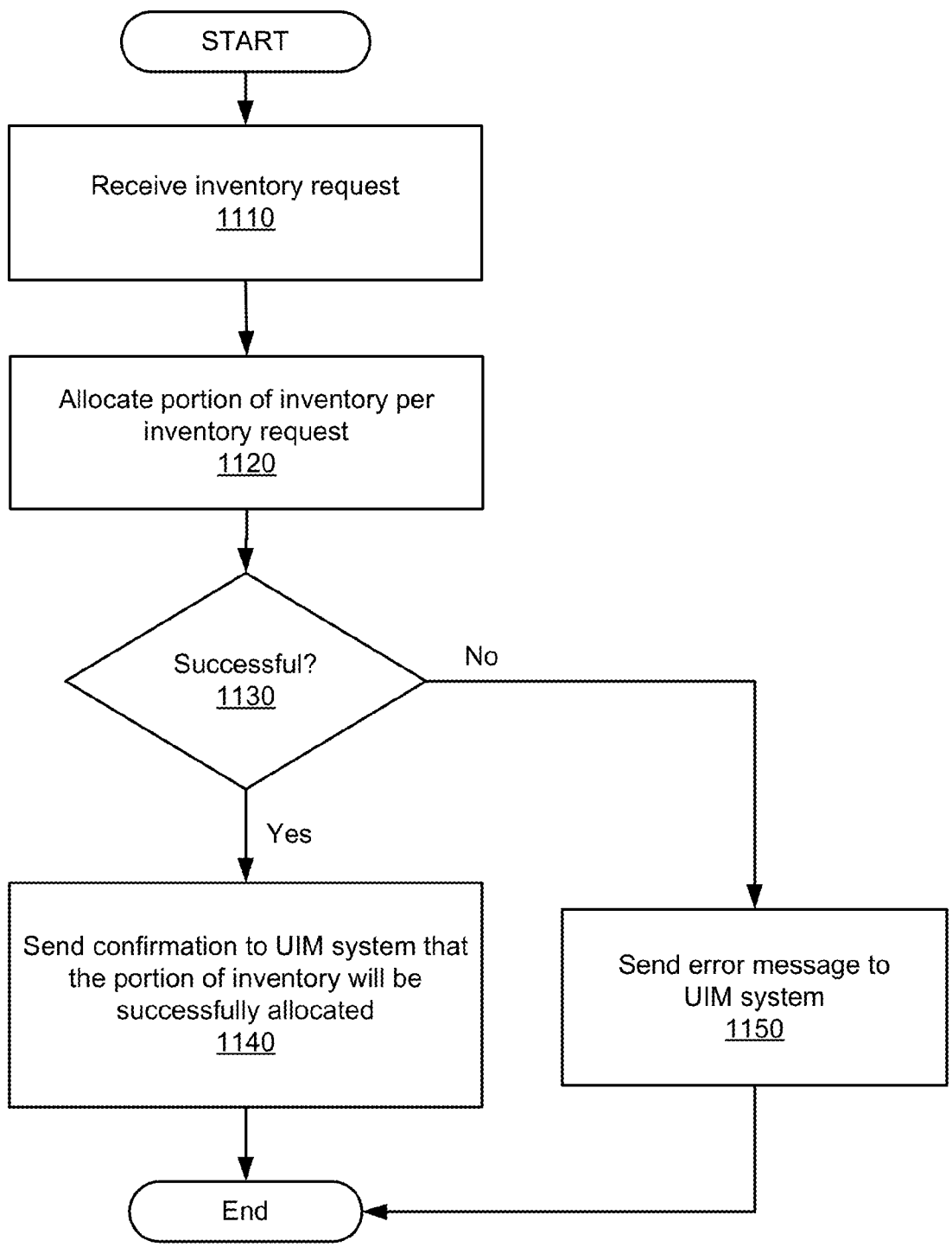
FIG. 11 is a flowchart illustrating another example process implemented by an inventory system, according to one embodiment.

FIG. 11 is a flowchart illustrating an example process implemented by an inventory system, upon receiving an inventory request. The process begins at operation 1110, where the inventory system receives an inventory request. Such an inventory request can be received directly from the UIM system. Alternatively, the inventory request can be received from a UIM system interface, after the inventory request has been transformed.

The process then continues to operation 1120. In operation 1120, a portion of inventory is identified from the inventory request received in operation 1110. Once identified, the portion of inventory is allocated, per the inventory request. Typically, an inventory request identifies a portion of inventory needed, along with other information for allocating the portion of inventory. A portion of inventory can be allocated by identifying the inventory data that is needed from the inventory system, the type of cooperation agreement to be setup for such inventory, the mode of cooperation to be used, and other additional parameters.

At operation 1130, the inventory system makes a determination as to whether the allocation of the portion of inventory was successful. If the allocation is successful, the process continues to operation 1140. In operation 1140, a confirmation notification or message can be sent to the UIM system. Such a confirmation indicates that the portion of inventory will be successfully allocated for the specified time period.

In the event that the allocation is not successful, the process continues to operation 1150. In operation 1150, an error message is sent from the inventory system to the UIM system. Such a message indicates that the portion of inventory has not and cannot be successfully allocated per the inventory request. The process then ends. The process of FIG. 11 can be repeated by all inventory systems having inventory requested by a UIM.

Figure 12:
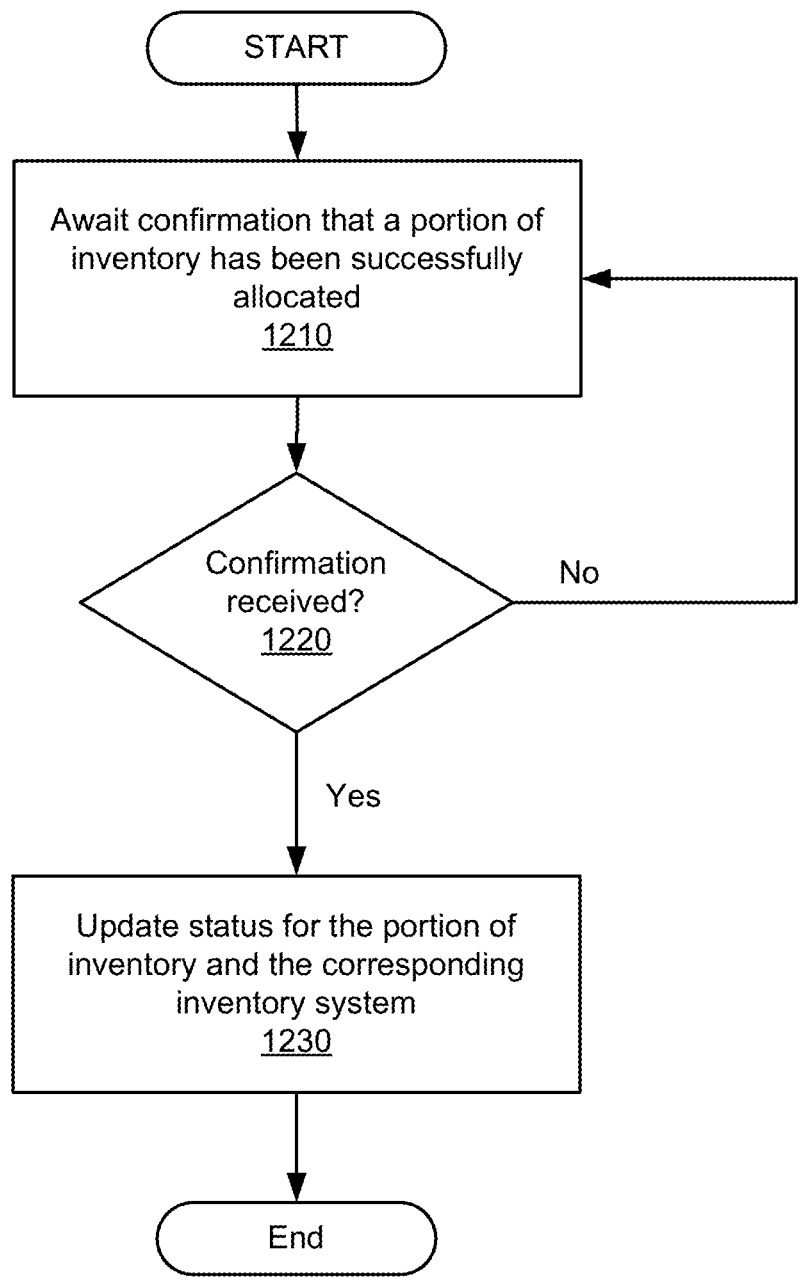
FIG. 12 is a flowchart illustrating another example process implemented by a unified inventory management system, according to one embodiment.

FIG. 12 is a flowchart illustrating an example process implemented by the UIM system. The process of FIG. 12 can be implemented as the UIM system awaits confirmation from an inventory system (e.g., an inventory system to which an inventory request has been sent by the UIM system). As will be appreciated, the process of FIG. 12 is and can be repeated for all inventory systems to which the UIM has sent inventory requests.

The process begins at operation 1210, where the UIM system awaits confirmation from the inventory system. After a UIM system transmits an inventory request to an inventory system, the UIM system awaits confirmation from the inventory system that the requested inventory has been or will be successfully allocated.

At operation 1220, a determination is made by a UIM system as to whether confirmation has been received from an inventory system. In the event that no confirmation has been received, the process loops back to operation 1210 to continue awaiting confirmation from an inventory system. In the event that confirmation has been received from an inventory system, the process continues to operation 1230.

In operation 1230, status information is updated at the UIM. This includes a status for the portion of inventory and the corresponding inventory system involved. Such updating may involve updating information maintained by the UIM system, which indicates whether an inventory request has been sent to the inventory system and whether the inventory has been successfully allocated by the inventory system. Once operation 1230 has been performed, the process ends. The process of FIG. 12 can be repeated for all inventory systems to which an inventory request has been sent by UIM.

Figure 13:
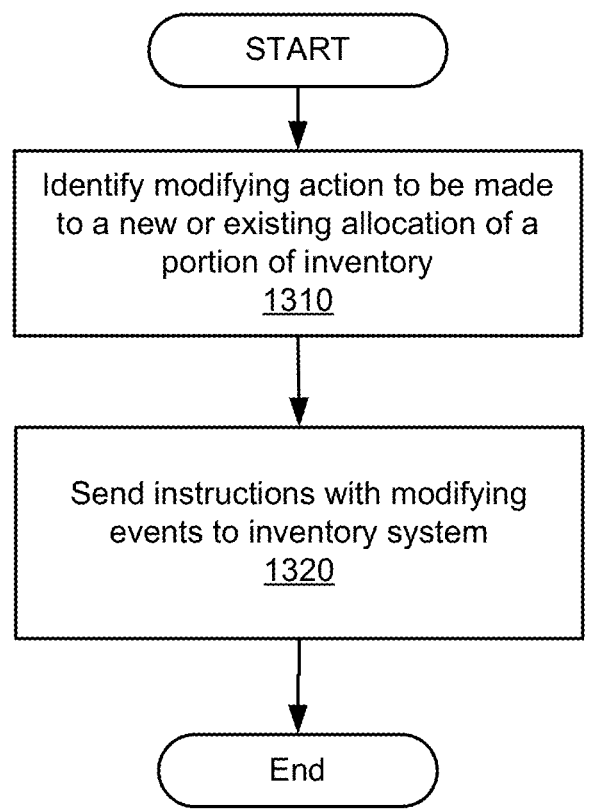
FIG. 13 is a flowchart illustrating another example process implemented by a unified inventory management system, according to one embodiment.

FIG. 13 is a flowchart illustrating an example process implemented by a UIM system. The process of FIG. 13 can be implemented in response to a UIM system identifying a modifying action to be made to an existing allocation for a portion of inventory. For example, the process of FIG. 13 can be performed whenever the management system, UIM, or inventory system want to change an existing cooperation agreement in some manner. This can include updating the agreement, changing the agreement, and/or terminating the agreement.

The process begins at operation 1310, where the UIM system identifies a modifying action to be made to a new or existing allocation of inventory. A modifying action can be one of many things. For example, an existing allocation can be changed, terminated, or temporarily suspended. Likewise, a new allocation can be modified due to cancellation or temporary hold.

Once a modifying action has been identified, the process continues to operation 1320. In operation 1320, instructions are sent from the UIM system to an inventory system to notify the inventory system of the modifying event. For example, the UIM system can send instructions to an inventory system to release the allocation of a portion of inventory or to change the mode of cooperation between cooperating systems. The modifying instructions that are sent to an inventory system are typically formatted in a similar form than that of an inventory request. Doing so maintains consistency with the communications exchanged between a management system, UIM, and the inventory systems. Once instructions have been sent to an inventory system, the process ends. This process can then be repeated multiple times and/or can be employed with other inventory systems.

FIG. 14 is a simplified block diagram illustrating an example of operations performed by a system providing inventory management functions according to embodiments of systems such as those described herein. In this example, system flow 1400 illustrates an example of the operations performed in effecting inventory management within the context of communication service providers. As shown, system 1400 may be employed by a communication service provider, in an attempt to allow communications to occur between a new system (e.g., optical service manager (OSM)) and pre-existing inventory systems (e.g., cooperative systems) via a UIM system.

System flow 1400 begins at step 1 where OSM submits a service order request to UIM. Such a service order request may be sent to UIM as part of creating a new service or disconnecting an existing service in UIM. A service order request is a business interaction requesting that UIM perform various actions on behalf of OSM. The service being requested will be created and configured in UIM with the appropriate resource assignments and/or service trails (if needed).

As an initial step, UIM will capture the service order (step 2). Capturing the service order entails saving the service order request in such a manner that represents the order. The service order can then be processed. As part of creating the service (step 3), UIM will determine what type of service is being requested and begin processing the service order.

In step 4, the service order is associated with the service and the necessary resources. A service trail is then configured in step 5. Configuring a service trail includes determining the termination points for the service trail and the connections needed to enable the service trail. For example, configuring a service trail includes determining which of the UIM and/or cooperative systems can provide the needed resources. In addition, configuring a service trail also includes determining the amount and type of lease agreements that are needed to enable the proper exchange of resources, data, and functionality to enable the service.

Once configured, UIM can assign the enabling connections, as illustrated in step 6. An enabling connection that is available in UIM can be assigned to enable the service trail. For any resources not sourced by UIM, the remaining connections are discovered, as illustrated in step 7. Such discovery can include analyzing data maintained by UIM to discover which, if any, of the cooperative systems can source the remaining resources needed to provide a service trail and determine the properties needed to enable a lease connection to each corresponding cooperative system. Properties for each lease connection are also created.

Once the missing connections have been identified, work orders can then be created for each corresponding cooperative system, as illustrated in step 8. Work orders are business interactions used for requesting actions on various inventory entities (e.g., resources managed within each cooperating system, such as a network resource, connectivity, devices, services, and so on). A work order can be generated to either lease or terminate a connection with an inventory system.

Service orders and work orders correlate with one another and thus define interaction schemas used by OSM and cooperative systems to communicate with UIM consistently and extensibly. By utilizing such interaction schemas, inventory entities can be effectively identified, grouped, and/or managed within a system. In addition, such interaction schemas allow for re-usability within systems.

In this type of setup, UIM delegates network resource management functionality to the cooperative system. UIM is simply focused on managing the new service. Thus, UIM will not be federating pipes to perform complex path analysis to enable a service trail, such functionality is delegated to the cooperative system.

In step 9, the missing connections are associated by adding an indicator to the work order to indicate a connection will be leased or terminated. In step 10, the service order is associated to enable a relationship to be built between the service order and the work order. Once the work orders have been created, and all necessary properties have been included therein, each work order request is transmitted to a cooperative system, as illustrated in step 11.

In system 1400, OSM seeks to provide a new service, as outlined in the service order request submitted in step 1. Once the service order is received, UIM is the component that determines how the new service can be implemented. For example, UIM can decipher the service order request and identify the new service to be provided, determine the resources needed to enable the new service, determine where such resources are sourced, and can instruct such resources to be allocated accordingly to enable the new service.

In step 12, a work order response is processed. This includes processing the work order and sending a response back to UIM. Once the response has been received by UIM, UIM can update the connection information maintained by UIM to indicate the corresponding connections have been leased or terminated, based on the agreements. In addition, the work order is also updated by UIM. In step 13, a service order response is transmitted by UIM to the OSM to indicate the update to the service order, and provides the services and resources to OSM.

To support a consistent way to identify entities that are cooperated or federated in UIM, entity identities are consistently used by UIM, OSM, and the cooperative systems. Additional information used for cooperative systems to support consistent entity identities include:

externalObjectId
    Communicates a public unique identity or key for a business entity within the context of the domain specified by externalManagementDomain.
externalName
    Provides a business meaningful name of the business entity (identified by externalObjectID) within context of the domain specified by externalManagementDomain.
externalManagementDomain
    Identifies an external system, name domain, party, or participant in a business entity exchange, cooperation, sharing or federation arrangement.
externalArrangement (LEASED_IN, LEASED_OUT, SHARED, FEDERATED)
    Identifies the pre-established cooperation model between UIM and the external party for the given entity. The valid cooperation arrangements are LEASED_IN, LEASED_OUT, SHARED and FEDERATED.
    LEASED_IN—this is used when the resource is leased by UIM from an external system (e.g. IP Address, Connection)
    LEASED_OUT—this is used when the resource is leased by UIM to an external system (e.g. VLAN ID)
    SHARED—this is used when the resource is managed cooperatively between UIM and an external system (e.g. Network System, Product Catalog—after they are shadowed into UIM)
    FEDERATED—this is used when the resource is temporary retrieved from an external system into UIM views (e.g. Network System, Product Catalog, IP Address—before they are shadowed into UIM)

In addition, several specification parameters can be employed to enable connectivity cooperation to occur between OSM, UIM, and the cooperative systems. Below are some examples that may be used:

| Specification Type | Specification Name | Description |
| --- | --- | --- |
| Business Interaction (BI) | Service Order | BI specification to create an instance of Service Order. |
| Business Interaction | Work Order | BI specification to create an instance of Work Order. |
| Capacity Provided | T3 Cap Prov | Describes 43.232 Mbps 100% consumable units that can be provided by a T3 facility. Used by the T3 facility pipe specification. |
| Capacity Required | DS1 Cap Req | Describes the 1.544 Mbps bandwidth required by the service trail. Used by the EUSA Service Trail pipe specification. |
| Pipe | T3 Facility | Describes the parent T3 Facility providing the DS1 Channel pipes owned by UIM, if any. The T3 Facility will use the T3 Signal Structure spec to define its channels. T3 Facility pipe specification is an allowable transport spec option for the EUSA Service Trail Configuration specification. |
| Pipe | DS1 Channel | Describes the DS1 Channel pipes provided the T3 Facility. It is used for creating leased connections to enable the EUSA Service Trail. This pipe spec is also related to the DS1 Signal so that the channel pipes are created with this specification. DS1 Channel pipe specification is an allowable transport spec option for the EUSA Service Trail Configuration specification. |
| Pipe | EUSA Service Trail | Pipe specification to create an instance of EUSA Service Trail. Its configuration is defined by the EUSA Service Trail Configuration specification. It also has a capacity required as defined by DS1 Cap Req. |
| Pipe Configuration | EUSA Service Trail Configuration | Pipe configuration specification to create an instance of EUSA Service Trail Configuration. It has a transport configuration item that accepts T3 Facility or DS1 Channel as pipe enablements, and End User Location as the originating and terminating termination point locations. |
| Service | EUSA Service | Service specification to create an instance of EUSA Service. Its configuration is defined by the EUSA Service Configuration specification. |
| Service Configuration | EUSA Service Configuration | Service configuration specification to create an instance of EUSA Service Configuration. It has a configuration item that accepts the EUSA Service Trail as a pipe assignment. |
| Role | TDM | Describes the Technology role for the T3 Facility and DS1 Channel pipes. |
| Role | Facility | Describes the Functional role for the T3 Facility. |
| Signal Termination Point | T3 Signal Structure | Defines the T3 Signal Structure providing 28 child DS1 Signals, with capacity provided described by the T3 Cap Prov. |
| Signal Termination Point | DS1 Signal | Defines the 1.544 Mbps capacity unit for a DS1 signal. |
| Place (Location) | Service Location | Describes the location where the EUSA Service Trail and Leased Connections are terminated at - the location where the service is intended for. |
| Place (Location) | Serving Location | Describes the location where the DACS are located at - the location where the service is originating from. T3 Facilities (hence the child DS1 Channel pipes) are terminated at the MUX on the DACS located in these locations. |
| Logical Device | DACS | Describes the LD's that are used in the BSC. The DS1 Channel pipes in UIM will terminate at DI's on these DACS. These DACS are located at a SWC. |
| Device Interface | DS3 Logical Interface | Describes the DI's for the parent DACS logical devices. The DS3 logical interface provides 28 DS1 subinterfaces. |
| Device Interface | DS1 Logical Interface | Describes the DI's for the parent DACS logical devices. The DS1 Channel pipes in UIM will terminate at these DI's. |

In addition, several rulesets can also be employed. Below is an example of the rulesets that may be used:

| Ruleset | Extension Type | Description |
| --- | --- | --- |
| CONNECTIVITY_COOPERATION_AUTOMATE_ CONFIGURATION.drl | INSTEAD | Automate the configuration of a trail by discovering and assigning new leased connectivity to the Trail. Also handle the case where existing leased connectivity are being removed so that lease termination can be sent to the client. |
| CONNECTIVITY_COOPERATION_CANCEL_ SERVICE_ORDER.drl | BEFORE | Logic to also cascade cancel any related active Work Order, if there are any. |
| CONNECTIVITY_COOPERATION_CANCEL_ WORK_ORDER.drl | BEFORE | Logic to also ensure that any open Connectivity lease request is canceled or terminated by sending a request to the client. |
| CONNECTIVITY_COOPERATION_CANCEL_ SERVICE_CONFIGURATION.drl | BEFORE | Logic to also cascade cancel any related trail pipe configuration, if there are any. |
| CONNECTIVITY_COOPERATION_CANCEL_ TRAIL_CONFIGURATION.drl | BEFORE | Logic to handle cancellation of trail pipe configuration. Existing pipe assignments that are either in PENDING_ASSIGN or PENDING_UNASSIGN status will be canceled by sending a Work Order request to Cancel, Terminate or re-Lease the Leased Connectivity. |
| CONNECTIVITY_COOPERATION_COMPLETE_ SERVICE_ORDER.drl | BEFORE | Logic to validate if there are any active child work orders. If there are any, generate validation exception. |
| CONNECTIVITY_COOPERATION_COMPLETE_ WORK_ORDER.drl | BEFORE | Logic to validate that the Work Order can be completed if requests have been responded and ordered connectivity have an externalObjectId. |
| CONNECTIVITY_COOPERATION_COMPLETE_ SERVICE_CONFIGURATION.drl | BEFORE | Logic to also cascade complete any related trail pipe configuration, if there are any. |
| CONNECTIVITY_COOPERATION_COMPLETE_ TRAIL_CONFIGURATION.drl | BEFORE | Logic to validate that the Trail pipe configuration can be completed. The current implementation validates that the Trail Pipe Configuration can be completed if the connectivity Lease and Termination requests have been responded to. |
| CONNECTIVITY_COOPERATION_DELETE_ CONFIGURATION_ITEMS.drl | BEFORE | Logic to trigger Leased Connectivity cancellation or termination Work Order request. |
| CONNECTIVITY_COOPERATION_UNASSIGN_ CONFIGURATION_ITEMS.drl | BEFORE | Logic to trigger Leased Connectivity cancellation or termination Work Order request. |
| CONNECTIVITY_COOPERATION_REASSIGN_ CONFIGURATION_ITEMS.drl | BEFORE | Logic to trigger Lease Connectivity Work Order request. |
| CONNECTIVITY_COOPERATION_SEND_ REQUEST.drl | INSTEAD | Logic to allow Work Order request to be sent manually per user request. |
| CONNECTIVITY_COOPERATION_UPDATE_ TRAIL.drl | BEFORE | Logic to discover missing connectivity to be leased from external third party system and generate work order. The Work Order can be used for requesting to Lease connectivity or to Terminate the lease. |
| CONNECTIVITY_COOPERATION_DELETE_ CONNECTION.drl | BEFORE | Logic to enforce business rules when leased connectivity is being deleted. |
| CONNECTIVITY_COOPERATION_UPDATE_ CONNECTION.drl | BEFORE | Logic to enforce business rules when leased connectivity is being updated. |
| CONNECTIVITY_COOPERATION_VALIDATE_ PRE_UPDATE.drl | BEFORE | Logic to enforce business rules when leased connectivity is being updated. |

An example schema can also include the following information:

```
interaction                                                          Interaction encapsulates
  header                                                             the order detail items and
    specification                                                    entities.
      name: Service Order / Work Order                               Each order has specific
      action: create | change | approve | issue | cancel | complete  actions.
    id:
    name:
    description:
    externalIdentity                                                 Order has UIM identity
      externalObjectId:                                              and also external identity.
      externalName:
      externalManagementDomain:
    state: created | in progress | completed | cancelled
    effectiveDate:
    property
      name:
      value:
  body                                                               Multiple order items per
    item (0..*)                                                      order, each with actions
```

| | |
|---|---|
| action: add \| change \| remove \| no change<br>externalIdentity<br>   externalObjectId:<br>   ( entity \| services \| connection )<br>parameter (0..*)<br>   name:<br>   value:<br>interaction (0..*)<br>   connection<br>      specification<br>         name:<br>      action: lease \| terminate<br>      id:<br>      name:<br>      description:<br>      externalIdentity<br>         externalObjectId:<br>         externalName:<br>         externalManagementDomain:<br>         externalArrangement: LEASED IN \| LEASED OUT \| SHARED \| FEDERATED<br>      state: endOfLife \| installed \| pendingInstall \|<br>            pendingRemove \| pendingUnavailable \| planned \| unavailable<br>      technology: TDM, ...<br>      signal<br>         transmissionSpeed<br>            minSpeed:<br>            maxSpeed:<br>            nominalSpeed:<br>            unitOfMeasure:<br>         signalCode: DS1, DS3, ...<br>      node<br>         typeOfNode: TERM-A, TERM-Z, INTERMEDIATE<br>         location<br>         device<br>         adjacentConnection<br>      parentConnection<br>      property (0..*)<br>         name:<br>         value: | and external identity<br>Each item defines the action for a specific entity, such as service or connection<br><br><br>connection has action to determine lease/terminate<br><br><br><br>Connection has UIM identity and external identity, including cooperation arrangement type<br><br><br><br>Defines the technology and signaling requirements for the connection request<br><br><br>Defines the A, Z and intermediate nodes for the connection request |

An example message used for data cooperation is as follows:

```
<bus:interaction>
 <bus:specification>
  <spec:name>Work Order</spec:name>
 </bus:specification>
 <bus:action>CREATE</bus:action
 <bus:id>36</bus:id>
 <bus:name>Work Order - 36</bus:name>
 <bus:externalObjectId>abc123</bus:externalObjectId>
 <bus:externalName>abc</bus:externalName>
 <bus:externalManagementDomain>ABC
 </bus:externalManagementDomain>
 <bus:effDate>2011-04-05T11:47:09.579-05:00</bus:effDate>
 <bus:input>
  <bus:item>
   <bus:action>ADD</bus:action>
    ...
  <bus:pipe>
   <pipe:specification>
    <spec:name>DS1 Channel</spec:name>
   </pipe:specification>
   <pipe:id>44</pipe:id>
   <pipe:name>44</pipe:name>
   <pipe:action>LEASE</pipe:action>
   <pipe:state>installed</pipe:state>
   <pipe:startDate>2011-04-05T11:47:04.455-05:00</pipe:startDate>
   <pipe:endDate xsi:nil="true"/>
   <pipe:technology>TDM</pipe:technology>
   <pipe:signal>
    <pipe:transmissionSpeed>
     <pipe:nominalSpeed>1.544</pipe:nominalSpeed>
     <pipe:unitOfMeasure>Mbps</pipe:unitOfMeasure>
    </pipe:transmissionSpeed>
    <pipe:signalCode>DS1</pipe:signalCode>
```

-continued

```
   </pipe:signal>
   <pipe:node>...</pipe:node>
  </bus:pipe>
 </bus:item>
 </bus:input>
</bus:interaction>
```

Figure 15:
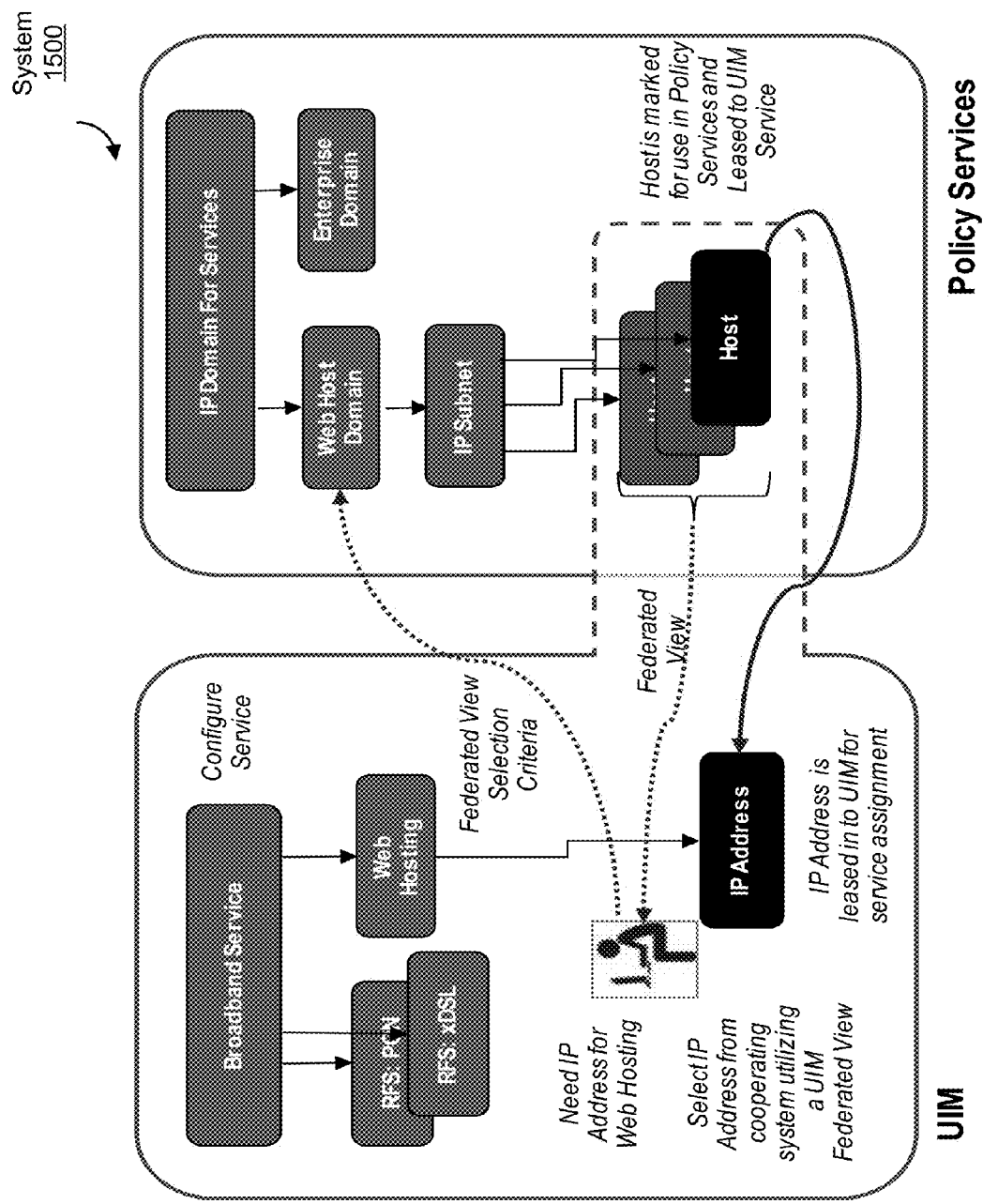
FIG. 15 is a simplified block diagram illustrating elements of another example application for inventory management, according to one embodiment.

FIG. 15 is a simplified block diagram illustrating elements of another example system that implements inventory management according to the present disclosure. In this example, system 1500 illustrates a system for enabling federated views of data and a lease-in mode of cooperation using a UIM. In system 1500, a broadband service is being configured. Resources needed for such a service reside within policy services (e.g., a type of inventory system). A query is made to policy services to obtain a viewable list of such resources. The list of such resources, which includes available host Internet Protocol (IP) Addresses, is made available to the user via a federated view of such resources at UIM.

The user can then select one or more desired host IP Addresses from the federated view. In response thereto, a work request is generated and transmitted from UIM to policy services. Policy services responds to the work request by marking the hosts as in-use and leasing such hosts to UIM via a lease agreement. The lease agreement is made using a lease-in mode of cooperation (since UIM is leasing in resources managed by policy services). The one or more leased host IP addresses can then be utilized for broadband service assignment.

Figure 16:
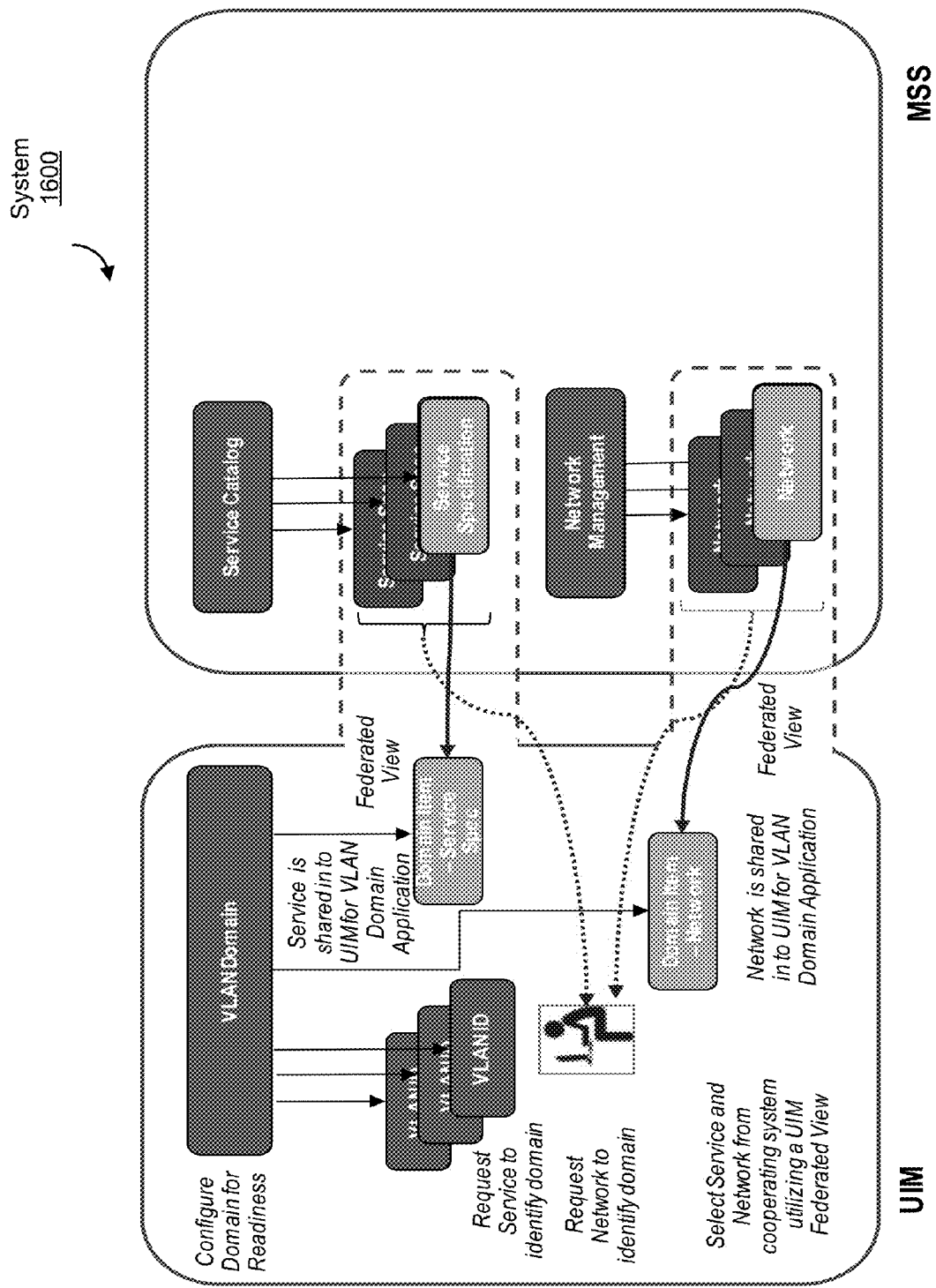
FIG. 16 is a simplified block diagram illustrating elements of yet another example application for inventory management, according to one embodiment.

FIG. 16 is a simplified block diagram illustrating elements of another example system that implements inventory management according to the present disclosure. In this example, system 1600 illustrates a Virtual Local Area Network (VLAN) management reference implementation that utilizes federate and share modes of cooperation using UIM.

In system 1600, a VLAN domain for readiness is being configured. A request for service and a request for network to identify domain are made within UIM. A MetaSolv Solution (MSS) shares service specifications with UIM. This type of sharing allows for VLAN domain application. In addition, the MSS also shares a network with UIM. This type of sharing also allows for VLAN domain application. A user of UIM can then select the service and network from the cooperating systems utilizing a UIM federated view.

Figure 17:
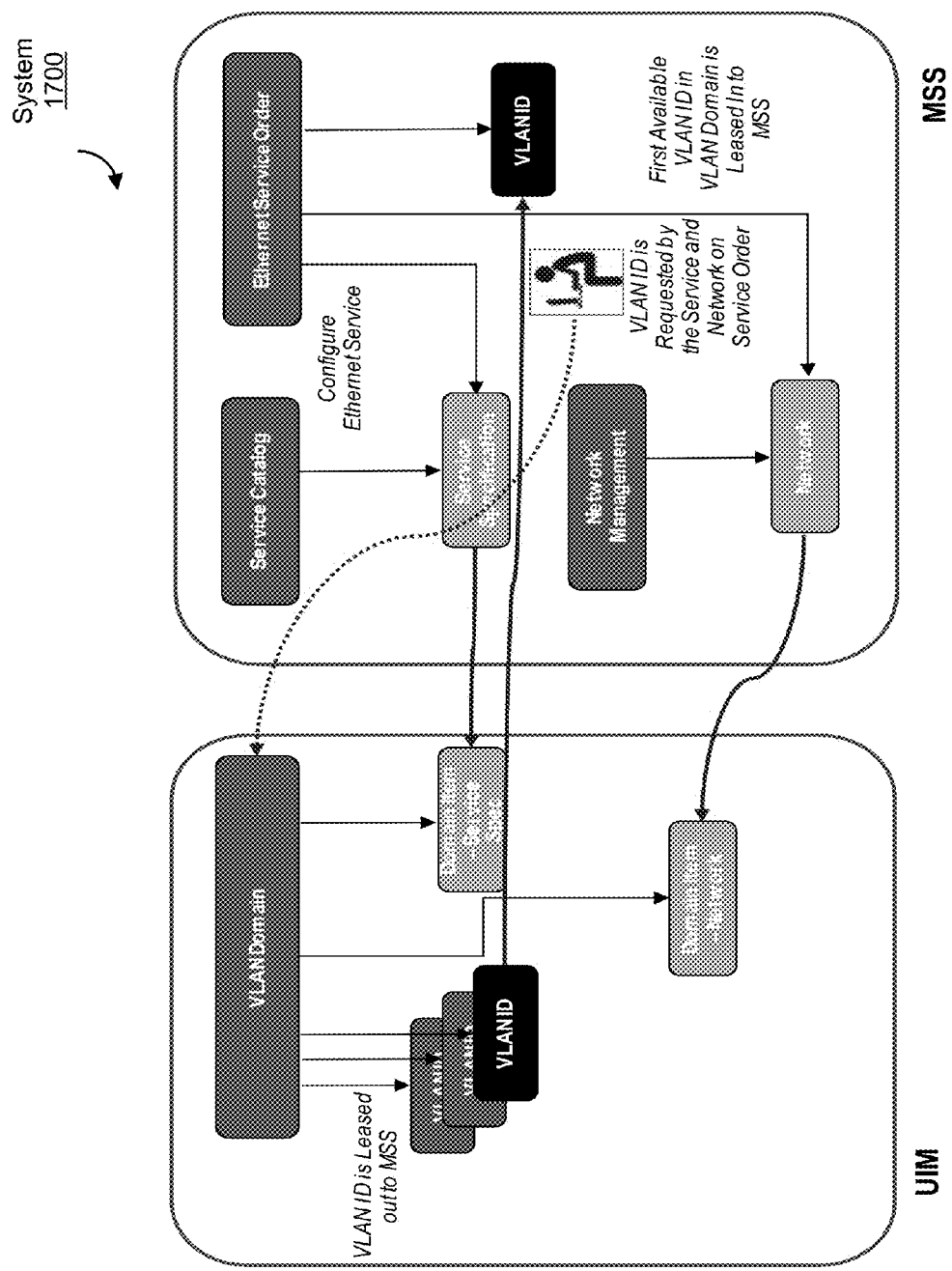
FIG. 17 is a simplified block diagram illustrating elements of yet another example application for inventory management, according to one embodiment.

FIG. 17 is a simplified block diagram illustrating elements of another example system that implements inventory management according to the present disclosure. In this example, system 1700 illustrates a VLAN management reference implementation enabling lease-out and share modes of cooperation using UIM.

In system 1700, an Ethernet service is being configured at MSS. An Ethernet service order is submitted to UIM. The necessary service specifications and network are shared by MSS and UIM. A VLAN ID is also requested by the service and network on the service order. In response thereto, UIM leases the first available VLAN ID in the VLAN domain (which the UIM manages) out to MSS (e.g., using a lease-out mode of communication).

Figure 18:
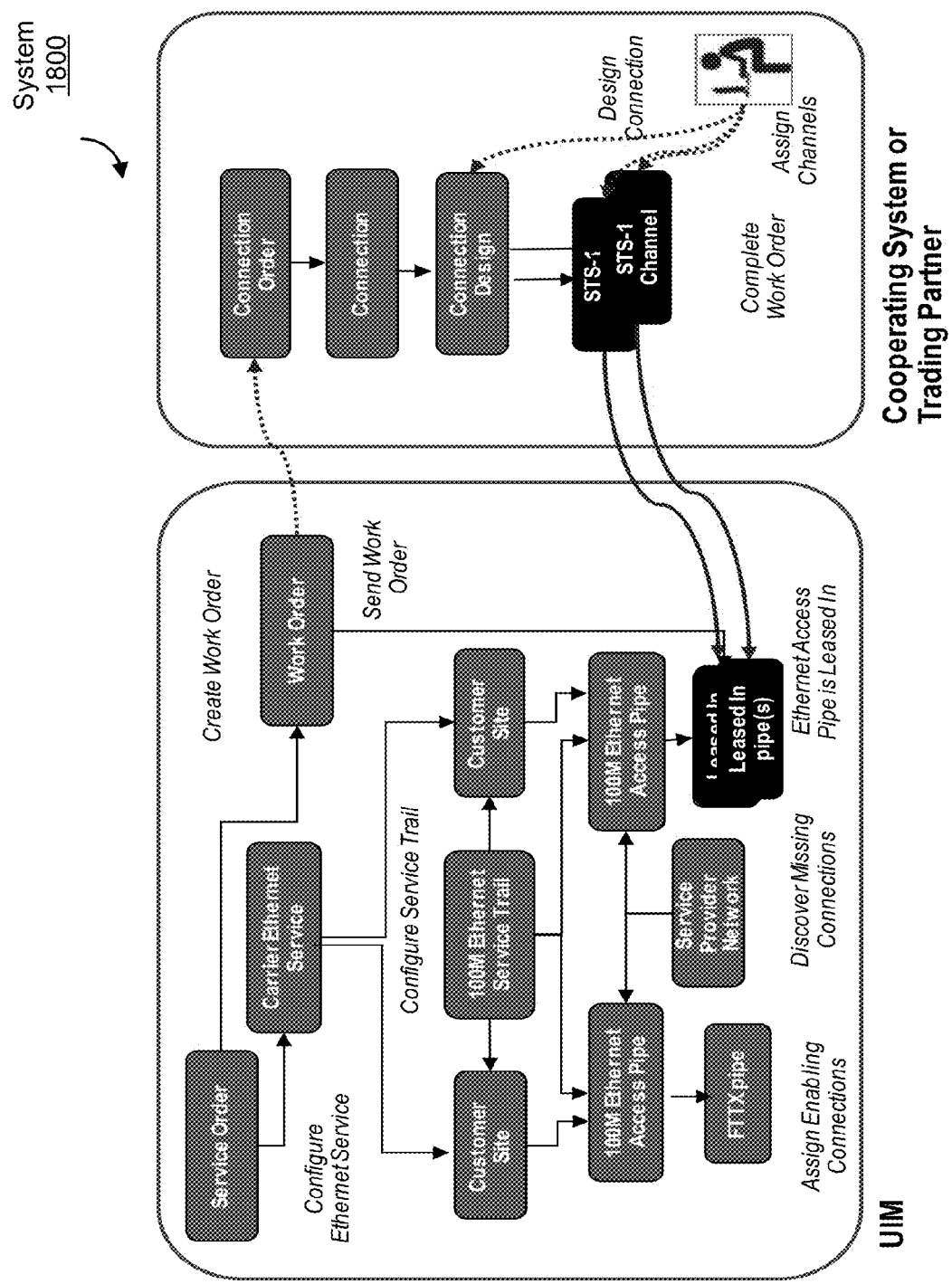
FIG. 18 is a simplified block diagram illustrating elements of yet another example application for inventory management, according to one embodiment.

FIG. 18 is a simplified block diagram illustrating elements of another system that implements inventory management according the present disclosure. In this example, system 1800 illustrates a connectivity reference implementation enabling a lease-in mode of cooperation using UIM.

In system 1800, an Ethernet service is being configured by UIM, as provided for in a service order. In response thereto, UIM begins configuring a service trail to identify the service and resources needed for the service order (e.g., a 100M Ethernet service trail requiring 100M Ethernet access pipes). The necessary connections are identified. If any connections are sourced by UIM, those connections are assigned to the service, per the service order requirements.

If any connections are not sourced by UIM, a discovery process is performed to discover the missing connections. These missing connections, once found (e.g., within a cooperating system), can be leased-in to UIM via a work order that is generated and sent to the cooperating system. The necessary connections are designed (if needed) and assigned to UIM. Doing so completes the work order. The connections from the cooperating system are now considered to be leased-in to UIM per a lease agreement.

Figure 19:
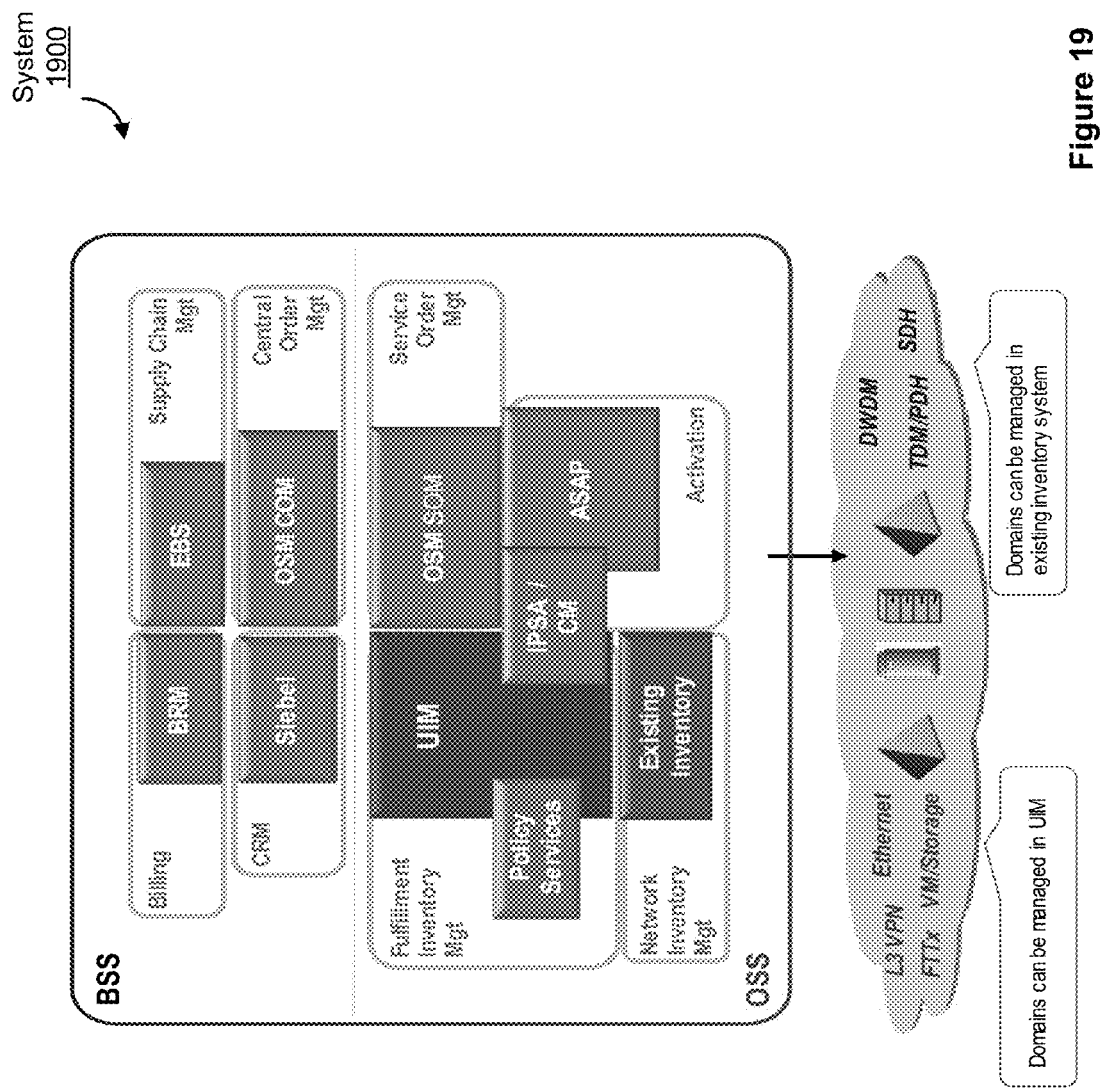
FIG. 19 is a simplified block diagram illustrating elements of yet another example application for inventory management, according to one embodiment.

FIG. 19 is a simplified block diagram illustrating elements of another system that implements inventory management according to the present disclosure. System 1900 illustrates an overall system configuration for an organization that seeks to manage its inventory. System 1900 includes business support systems (BSS) with components for billing, supply chain management, customer relations management, and central order management. In addition, system 1900 includes other support systems (OSS) with components for managing fulfillment inventory, service orders, network inventory, and activation. As shown, domains for services can be managed in UIM or existing inventory systems.

Utilizing system 1900 allows for expanded revenue opportunities for an organization. This is because UIM is being utilized for next generation services and can cooperate with existing inventory systems. The cost of deployment is also reduced given the expansion of OSS solutions that can come about using existing inventory systems. In addition, UIM can utilize cooperative inventory data to minimize costly data migrations.

An Example Computing and Network Environment

As shown above, the present invention can be implemented using a variety of computer systems and networks. An example of one such computing and network environment is described below with reference to FIGS. 20 and 21.

Figure 20:
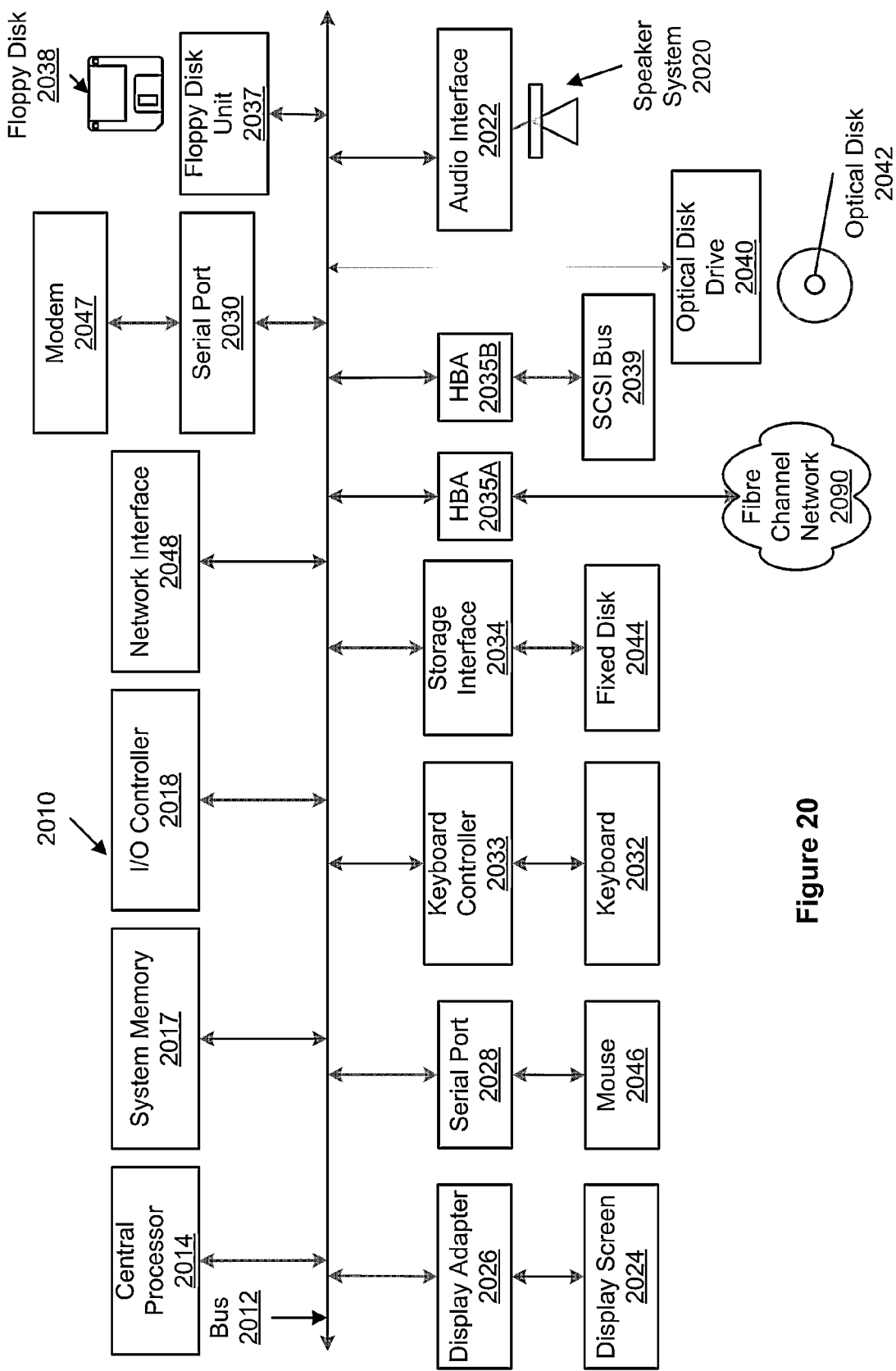
FIG. 20 is a simplified block diagram of an example computer system for implementing aspects of the present disclosure, according to one embodiment.

FIG. 20 depicts a block diagram of a computer system 2010 suitable for implementing aspects of the present invention (e.g., a management system, UIM system, inventory systems, and so on). Computer system 2010 includes a bus 2012 which interconnects major subsystems of computer system 2010, such as a central processor 2014, a system memory 2017 (typically RAM, but which may also include ROM, flash RAM, or the like), an input/output controller 2018, an external audio device, such as a speaker system 2020 via an audio output interface 2022, an external device, such as a display screen 2024 via display adapter 2026, serial ports 2028 and 2030, a keyboard 2032 (interfaced with a keyboard controller 2033), a storage interface 2034, a floppy disk unit 2037 operative to receive a floppy disk 2038, a host bus adapter (HBA) interface card 2035A operative to connect with a Fibre Channel network 2090, a host bus adapter (HBA) interface card 2035B operative to connect to a SCSI bus 2039, and an optical disk drive 2040 operative to receive an optical disk 2042. Also included are a mouse 2046 (or other point-and-click device, coupled to bus 2012 via serial port 2028), a modem 2047 (coupled to bus 2012 via serial port 2030), and a network interface 2048 (coupled directly to bus 2012).

Bus 2012 allows data communication between central processor 2014 and system memory 2017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 2010 are generally stored on and accessed via a computer-readable medium, such as a hard disk drive (e.g., fixed disk 2044), an optical drive (e.g., optical disk drive 2040), a floppy disk unit 2037, or other storage medium. Additionally, applications can be in the form of electronic signals modulated in accordance with the application and data communication technology when accessed via modem 2047 or network interface 2048.

Storage interface 2034, as with the other storage interfaces of computer system 2010, can connect to a standard computer-readable medium for storage and/or retrieval of information, such as a fixed disk 2044. Fixed disk drive 2044 may be a part of computer system 2010 or may be separate and accessed through other interface systems. Modem 2047 may provide a direct connection to a remote server via a telephone link or to the Internet via an internet service provider (ISP). Network interface 2048 may provide a direct connection to a remote server via a direct network link to the Internet via a POP (point of presence). Network interface 2048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 20 need not be present to practice the present invention. The devices and subsystems can be interconnected in different ways from that shown in FIG. 20. The operation of a computer system such as that shown in FIG. 20 is readily known in the art and is not discussed in detail in this application. Code to implement the present invention can be stored in computer-readable storage media such as one or more of system memory 2017, fixed disk 2044, optical disk 2042, or floppy disk 2038. The operating system provided on computer system 2010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 21:
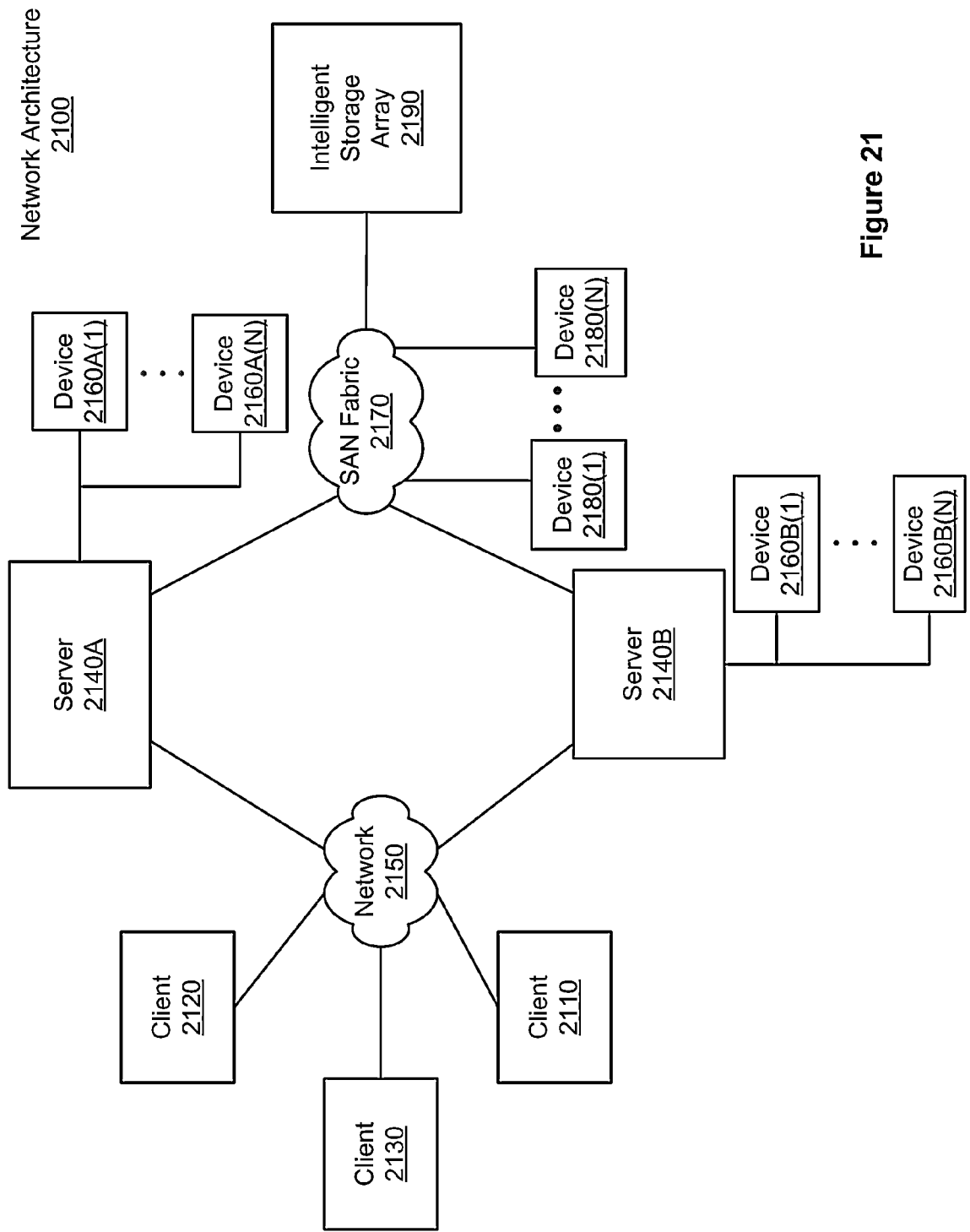
FIG. 21 is a simplified block diagram of a network architecture suitable for implementing aspects of the present disclosure, according to one embodiment.

FIG. 21 is a block diagram depicting a network architecture 2100 in which client systems 2110, 2120 and 2130, as well as storage servers 2140A and 2140B (any of which can be implemented using computer system 2010), are coupled to a network 2150. Storage server 2140A is further depicted as having storage devices 2160A(1)-(N) directly attached, and storage server 2140B is depicted with storage devices 2160B(1)-(N) directly attached. Storage servers 2140A and 2140B are also connected to a SAN fabric 2170, although connection to a storage area network is not required for operation of the invention. SAN fabric 2170 supports access to storage devices 2180(1)-(N) by storage servers 2140A and 2140B, and so by client systems 2110, 2120 and 2130 via network 2150. Intelligent storage array 2190 is also shown as an example of a specific storage device accessible via SAN fabric 2170.

With reference to computer system 2010, modem 2047, network interface 2048 or some other method can be used to provide connectivity from each of client computer systems 2110, 2120 and 2130 to network 2150. Client systems 2110, 2120 and 2130 are able to access information on storage server 2140A or 2140B using, for example, a web browser or other client software (not shown). Such a client allows client systems 2110, 2120 and 2130 to access data hosted by storage server 2140A or 2140B or one of storage devices 2160A(1)-(N), 2160B(1)-(N), 2180(1)-(N) or intelligent storage array 2190. FIG. 21 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 2010). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIGS. 1-6.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
receiving a request in a common form, wherein
the request is received by a unified inventory management system,
the request is received from a management system, and
the request comprises a request for inventory from one or more inventory systems;
identifying a first inventory system, wherein
the first inventory system manages a first portion of inventory, and
the first portion of inventory is needed to fulfill the request;
converting the request in the common form to a request in a first native form corresponding to the first inventory system;
transmitting the request in the first native form to the first inventory system;
collecting information describing the first portion of inventory from the first inventory system;
identifying a second inventory system, wherein
the second inventory system manages a second portion of inventory, and
the second portion of inventory is needed to fulfill the request;
converting the request in the common form to a request in a second native form corresponding to the second inventory system;
transmitting the request in the second native form to the second inventory system;
collecting information describing the second portion of inventory from the second inventory system;
combining (a) the information describing the first portion of inventory and (b) the information describing the second portion of inventory to create a unified response to the request; and
sending the unified response to the management system.

2. The method of claim 1, further comprising:
creating a first inventory request, wherein
the first inventory request is configured to be sent to the first inventory system and the second inventory system,
the first inventory request is configured to cause the first inventory system to allocate the first portion of inventory according to the first inventory request, and
the first inventory request is configured to cause the second inventory system to allocate the second portion of inventory according to the first inventory request.

3. The method of claim 1, further comprising:
creating a first inventory request, wherein
the first inventory request is configured to be sent to the first inventory system, and
the first inventory request is configured to cause the first inventory system to allocate the first portion of inventory according to the first inventory request; and creating a second inventory request, wherein
the second inventory request is configured to be sent to the second inventory system, and
the second inventory request is configured to cause the second inventory system to allocate the second portion of inventory according to the second inventory request.

4. The method of claim 1, wherein the first inventory system and the second inventory system are unable to communicate with one another to create a unified response to the request.

5. The method of claim 1, further comprising:
receiving information related to the first inventory system, wherein
the information is received from the first inventory system,
the information is created in response to the unified inventory management system requesting the information, and
the information is created by performing an analysis of inventory resources and communication paths available to the first inventory system.

6. The method of claim 1, further comprising:
identifying a third portion of inventory, wherein
the third portion of inventory is managed by the unified inventory management system, and
the third portion of inventory is also needed to fulfill the request; and
allocating the third portion of inventory according to a third inventory request.

7. The method of claim 1, wherein
the first inventory request comprises a first set of properties for allocating the first portion of inventory, and
the second inventory request comprises a second set of properties for allocating the second portion of inventory.

8. The method of claim 1, further comprising:
receiving confirmation, from the first inventory system, that the first portion of inventory has been successfully allocated according to the first inventory request; and
receiving confirmation, from the second inventory system, that the second portion of inventory has been successfully allocated according to the second inventory request.

9. The method of claim 8, further comprising:
sending confirmation to the management system that the request will be fulfilled.

10. The method of claim 1, wherein
the unified inventory management system comprises
a list of inventory systems,
a list of available resources provided by each of the inventory systems, and
a corresponding status identifier for each of the available resources.

11. A computer readable storage medium configured to store instructions that, when executed by a processor, are configured to cause the processor to perform a method comprising:
receiving a request in a common form, wherein
the request is received by a unified inventory management system,
the request is received from a management system, and
the request comprises a request for inventory from one or more inventory systems;
identifying a first inventory system, wherein
the first inventory system manages a first portion of inventory, and the first portion of inventory is needed to fulfill the request;

converting the request in the common form to a request in a first native form corresponding to the first inventory system;

transmitting the request in the first native form to the first inventory system;

collecting information describing the first portion of inventory from the first inventory system;

identifying a second inventory system, wherein
the second inventory system manages a second portion of inventory, and
the second portion of inventory is needed to fulfill the request;

converting the request in the common form to a request in a second native form corresponding to the second inventory system;

transmitting the request in the second native form to the second inventory system;

collecting information describing the second portion of inventory from the second inventory system;

combining (a) the information describing the first portion of inventory and (b) the information describing the second portion of inventory to create a unified response to the request; and sending the unified response to the management system.

12. The computer readable storage medium of claim 11, wherein the method further comprises:
creating a first inventory request, wherein
the first inventory request is configured to be sent to the first inventory system and the second inventory system,
the first inventory request is configured to cause the first inventory system to allocate the first portion of inventory according to the first inventory request, and
the first inventory request is configured to cause the second inventory system to allocate the second portion of inventory according to the first inventory request.

13. The computer readable storage medium of claim 11, wherein the method further comprises:
creating a first inventory request, wherein
the first inventory request is configured to be sent to the first inventory system, and
the first inventory request is configured to cause the first inventory system to allocate the first portion of inventory according to the first inventory request;
creating a second inventory request, wherein
the second inventory request is configured to be sent to the second inventory system, and
the second inventory request is configured to cause the second inventory system to allocate the second portion of inventory according to the second inventory request.

14. The computer readable storage medium of claim 11, wherein the method further comprises:
identifying a third portion of inventory, wherein
the third portion of inventory is managed by the unified inventory management system, and
the third portion of inventory is also needed to fulfill the request; and
allocating the third portion of inventory according to a third inventory request.

15. The computer readable storage medium of claim 11, wherein the method further comprises:
receiving confirmation, from the first inventory system, that the first portion of inventory has been successfully allocated according to the first inventory request;
receiving confirmation, from the second inventory system, that the second portion of inventory has been successfully allocated according to the second inventory request; and
sending confirmation to the management system that the request will be fulfilled.

16. An apparatus comprising:
a processor; and
a memory, coupled to the processor, wherein the memory is configured to store instructions executable by the processor to:
receiving a request in a common form, wherein
the request is received by a unified inventory management system,
the request is received from a management system, and
the request comprises a request for inventory from one or more inventory systems;
identifying a first inventory system, wherein
the first inventory system manages a first portion of inventory, and
the first portion of inventory is needed to fulfill the request;
converting the request in the common form to a request in a first native form corresponding to the first inventory system;
transmitting the request in the first native form to the first inventory system;
collecting information describing the first portion of inventory from the first inventory system;
identifying a second inventory system, wherein
the second inventory system manages a second portion of inventory, and
the second portion of inventory is needed to fulfill the request;
converting the request in the common form to a request in a second native form corresponding to the second inventory system;
transmitting the request in the second native form to the second inventory system;
collecting information describing the second portion of inventory from the second inventory system;
combining (a) the information describing the first portion of inventory and (b) the information describing the second portion of inventory to create a unified response to the request; and
sending the unified response to the management system.

* * * * *